(12) United States Patent
Tarkhanyan et al.

(10) Patent No.: US 8,745,383 B2
(45) Date of Patent: Jun. 3, 2014

(54) SECURE COMPUTING ENVIRONMENT USING A CLIENT HEARTBEAT TO ADDRESS THEFT AND UNAUTHORIZED ACCESS

(75) Inventors: Anahit Tarkhanyan, Cupertino, CA (US); Ravi Gupta, San Jose, CA (US); Gaurav Banga, Cupertino, CA (US)

(73) Assignee: Absolute Software Corporation, Vancouver, BC (CA)

( * ) Notice: Subject to any disclaimer, the term of this patent is extended or adjusted under 35 U.S.C. 154(b) by 331 days.

(21) Appl. No.: 12/538,044

(22) Filed: Aug. 7, 2009

(65) Prior Publication Data

US 2010/0037291 A1 Feb. 11, 2010

Related U.S. Application Data

(60) Provisional application No. 61/188,404, filed on Aug. 8, 2008.

(51) Int. Cl.
*G06F 21/00* (2013.01)

(52) U.S. Cl.
USPC .............................. 713/164; 713/187; 726/22

(58) Field of Classification Search
USPC ......................................................... 726/35
See application file for complete search history.

(56) References Cited

U.S. PATENT DOCUMENTS

| | | | |
|---|---|---|---|
| 5,375,243 A | 12/1994 | Parzych et al. | |
| 6,005,476 A | 12/1999 | Valiulis | |
| 6,100,806 A | 8/2000 | Gaukel | |
| 6,691,225 B1 | 2/2004 | Suffin | |
| 7,536,536 B1* | 5/2009 | Joshi et al. | 713/1 |
| 7,711,953 B2 | 5/2010 | Ali et al. | |
| 2002/0171546 A1 | 11/2002 | Evans et al. | |
| 2002/0194500 A1 | 12/2002 | Bajikar | |
| 2003/0005316 A1 | 1/2003 | Girard | |
| 2003/0159070 A1* | 8/2003 | Mayer et al. | 713/201 |
| 2004/0139343 A1 | 7/2004 | Shieh | |
| 2005/0044404 A1* | 2/2005 | Bhansali et al. | 713/200 |
| 2005/0111664 A1 | 5/2005 | Bhansali et al. | |

(Continued)

FOREIGN PATENT DOCUMENTS

WO WO 2004/102823 A1 11/2004

OTHER PUBLICATIONS

International Search Report and Written Opinion of Jun. 23, 2011 in International Application PCT/US10/054418.

(Continued)

*Primary Examiner* — Izunna Okeke
(74) *Attorney, Agent, or Firm* — Brokaw Patent Law PC; Christopher J. Brokaw

(57) ABSTRACT

Techniques for securing a client. An operating system agent is one or more software modules that execute in an operating system of a client, such as a portable computer. Portions of the operating system agent may monitor resources of the client. The operating system agent sends a message, which describes an operational state of the operating system agent, to a BIOS agent. The BIOS agent is one or more software modules operating in a BIOS of the client. The BIOS agent performs an action based on a policy that is described by policy data stored within the BIOS of the client. The BIOS agent performs the action in response to either (a) the operational state described by the message, or (b) the BIOS agent not receiving the message after an expected period of time.

19 Claims, 12 Drawing Sheets

(56) References Cited

U.S. PATENT DOCUMENTS

| | | |
|---|---|---|
| 2006/0107329 A1* | 5/2006 | Frank et al. ............ 726/26 |
| 2006/0179293 A1 | 8/2006 | O'Connor et al. |
| 2006/0206720 A1 | 9/2006 | Harada et al. |
| 2007/0030149 A1 | 2/2007 | Hoerner |
| 2008/0005561 A1 | 1/2008 | Brown et al. |
| 2008/0096529 A1 | 4/2008 | Zellner |
| 2008/0120716 A1 | 5/2008 | Hall et al. |
| 2008/0189776 A1 | 8/2008 | Constable |
| 2008/0222705 A1 | 9/2008 | Goodmon et al. |
| 2008/0261560 A1 | 10/2008 | Ruckart |
| 2008/0282254 A1 | 11/2008 | Blander et al. |
| 2009/0121927 A1 | 5/2009 | Moshfeghi |
| 2009/0150970 A1 | 6/2009 | Hinds et al. |
| 2009/0249434 A1 | 10/2009 | Challener et al. |
| 2009/0249443 A1 | 10/2009 | Fitzgerald et al. |
| 2010/0037312 A1 | 2/2010 | Tarkhanyan et al. |
| 2010/0037323 A1 | 2/2010 | Lemieux et al. |
| 2010/0050244 A1 | 2/2010 | Tarkhanyan et al. |
| 2010/0100972 A1 | 4/2010 | Lemieux et al. |
| 2011/0258247 A1 | 10/2011 | Gordon |

OTHER PUBLICATIONS

International Search Report and Written Opinion of Aug. 2, 2011 in International Application PCT/US10/057907.

International Search Report and Written Opinion mailed Oct. 20, 2009 for International Application No. PCT/US2009/053212 12 pages.

International Search Report and Written Opinion mailed Oct. 20, 2009 for International Application No. PCT/US2009/053213 12 pages.

* cited by examiner

400

600

650

700

800

SECURE COMPUTING ENVIRONMENT USING A CLIENT HEARTBEAT TO ADDRESS THEFT AND UNAUTHORIZED ACCESS

CLAIM OF PRIORITY

This application claims benefit of Provisional Application Ser. No. 61/188,404, filed Aug. 8, 2008, entitled "Theft Deterrent and Secure Computing Environment," by Gaurav Banga et al., the entire contents of which are incorporated by reference as if fully set forth herein.

RELATED APPLICATION

This application is related to U.S. patent Ser. No. 12/321,504, entitled "Secure Platform Management with Power Savings Capability," filed by Gaurav Banga et al. on Jan. 21, 2009, the entire contents of which are herein incorporated by reference as if fully set forth herein.

This application is also related to U.S. patent Ser. No. 11/026,813, entitled "Secure Firmware Update," filed by Andrew Cottrell et al. on Dec. 28, 2004, the entire contents of which are herein incorporated by reference as if fully set forth herein.

This application is also related to U.S. patent Ser. No. 12/538,040, entitled "Receiving Policy Data from a Server to Address Theft and Unauthorized Access of a Client," filed by Jacques Lemieux et al. on Aug. 7, 2009, the entire contents of which are herein incorporated by reference as if fully set forth herein.

This application is also related to U.S. patent Ser. No. 12/538,033, entitled "Secure Computing Environment to Address Theft and Unauthorized Access," filed by Anahit Tarkhanyan et al. on Aug. 7, 2009, the entire contents of which are herein incorporated by reference as if fully set forth herein.

FIELD OF THE INVENTION

The present invention relates to approaches for protecting resources, stored on a computerized device, from theft or unauthorized access.

BACKGROUND OF THE INVENTION

The use of portable computers, such as laptops or personal digital assistants (PDAs), has become very popular in recent years. Many people store personal information or documents, such as social security numbers, credit card information, and family photos, on their laptops. Also, the use of portable computers is quite common in the modern business environment. Corporate laptops and PDAs often contain confidential or sensitive business information, such as confidential documentation, e-mail addresses, bank accounts, and trade secrets.

It has been estimated that one laptop is stolen every 53 seconds. Theft of portable computers and intellectual property is an increasing concern. Unfortunately, only a very small percentage of stolen laptops are ever returned. Even if a stolen laptop is recovered, the confidential, sensitive, or personal data that was stored thereon may have been accessed by malicious parties, which is undesirable.

SUMMARY OF THE INVENTION

Approaches for securing a client, such as a portable computer, are provided. Embodiments of the invention secure the resources of a wide variety of clients from theft or unauthorized access.

In an embodiment, a client includes, among other components, an operating system agent and a BIOS agent. An operating system agent is one or more software modules that execute in an operating system of the client, while the BIOS agent is one or more software modules that execute in the BIOS of the client. Embodiments of the invention may implement the BIOS agent in a manner that prevents unauthorized users from deleting, overwriting, reading, or otherwise tampering with the BIOS agent. The BIOS agent, among other responsibilities, monitors the health of the operating system agent, which in turn, monitors the health of resources of the client.

The operating system agent may intermittently send a message that describes an operational state of the operating system agent to a BIOS agent. The BIOS agent may perform an action based on a policy that is described by policy data stored within the BIOS of the client. To illustrate an example, the BIOS agent may perform an action specified by a policy in response to the operational state described by the message received by the BIOS agent and sent by the operating system agent. If the operational state described by the message suggests that a malicious user is attempting to access resources of the client or disable the operating system agent, then the BIOS agent may disable the client, require that the user submit authentication credentials to the client, or any other action which may be specified by the policy.

As another example, if the BIOS agent does not receive the message from the operating system agent after an expected period of time, then the BIOS agent may conclude that the operating system agent has been disabled, and may take appropriate action as described by the one or more policies stored by the BIOS agent. Advantageously, the policies stored by the BIOS agent may be customized to accommodate a wide variety of contexts in which a client may be employed.

The approaches described herein are not meant to describe all the embodiments of the invention, as other embodiments of the invention may differ in their operation compared to the illustrative approaches discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for protecting resources, stored on a computerized device, from theft or unauthorized access are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

System Overview

Figure 1A:
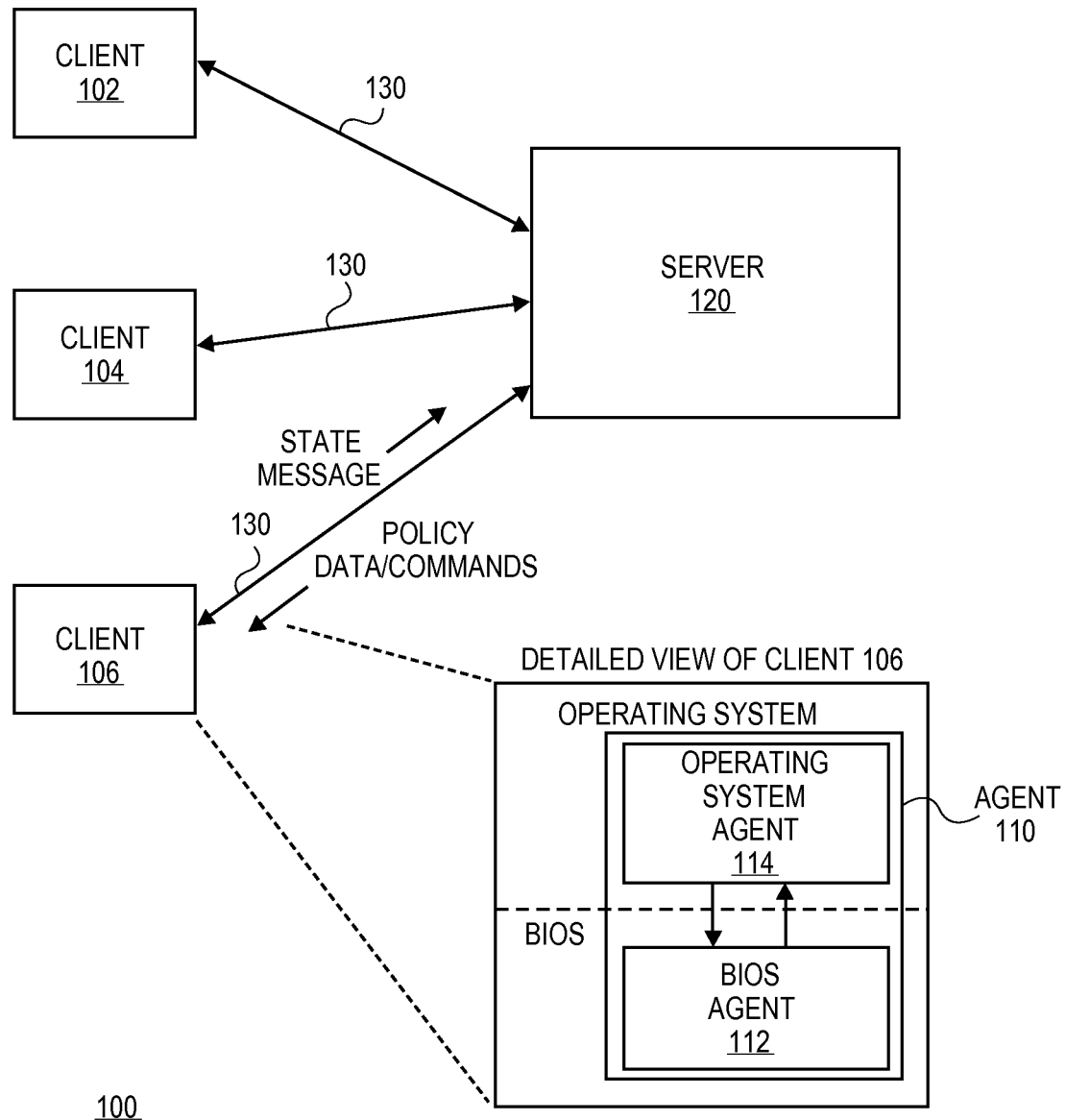
FIG. 1A is a high level block diagram of a system for protecting resources of a client from theft or unauthorized access according to an embodiment of the invention.

FIG. 1A is a high level block diagram of a system 100 for protecting resources of a client from theft or unauthorized access according to an embodiment of the invention. In an embodiment, system 100 includes clients 102, 104, and 106, server 120, and communications link 130. System 100 may be used to implement security policies to ensure that data stored on clients 102, 104, and 106 is protected from theft and authorized access. While FIG. 1A depicts three clients, there are no restrictions on the number of clients that an embodiment of the invention may have. Thus, embodiments of the invention may employ a single client or may employ a plurality of clients.

Clients 102, 104, and 106, as broadly used herein, refer to any computerized device which is capable of executing a BIOS and an operating system. Typically, a client will be a portable device, such as, for example, a laptop, a personal digital assistant (PDA), a cell phone, a game system (such as an Xbox available from Microsoft Corporation of Redmond, Wash. or a Playstation 3 available from Sony Corporation of Park Ridge, N.J.), or a tablet computer, although there are no size or weight restrictions of what may constitute a client. Thus, a client may be implemented using a relatively large, immobile, or cumbersome computerized device, such as a vending machine, a computerized gasoline dispenser, or an automatic teller machine (ATM).

FIG. 1A depicts a detailed view of client 106. As illustrated by FIG. 1A, each client in system 100 executes a BIOS and an operating system. In an embodiment, each client includes an agent 110 (the client may have many other components in addition to agent 110). Agent 110 is a set of software components that operate to ensure that resources on the client upon which agent 110 resides are protected from theft and unauthorized access. Each agent 110 comprises two portions, namely a BIOS agent 112 and an operating system agent 114. BIOS agent 112 may be implemented by one or more software modules that execute in the BIOS of a client, while operating system agent 114 may be implemented by one or more software modules that execute in the operating system of the client.

Among other functions that operating system agent 114 performs, operating system agent 114 monitors the resources of the client to ensure that the resources are not subject to theft or unauthorized access. After analyzing resources of a client for signs of theft, unauthorized access, or otherwise malicious activity, operating system agent 114 generates a heartbeat message that describes the operational state of the operating system agent 114, and thereafter sends the heartbeat message to BIOS agent 112. BIOS agent 112 stores security policies which the client receives from server 120. These security policies instruct BIOS agent 112 to perform certain actions based on the content of the heartbeat message or whether the heartbeat message was received within an expected duration of time.

Server 120, as broadly used herein, refers to any mechanism capable of communicating with a client. Server 120 may be used to receive status information from clients as well as transmit policy data and commands to clients. For example, an owner of a set of clients may interact with server 120 to define one or more security policies, and thereafter server 120 may disseminate those defined security polices to the set of clients belonging to the owner.

Figure 1B:
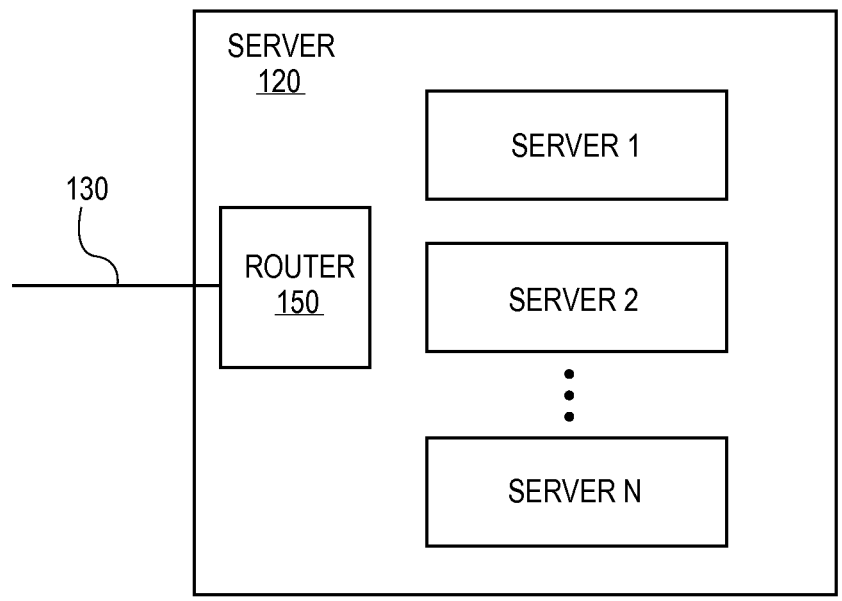
FIG. 1B is a block diagram of a system employing multiple servers according to an embodiment of the invention.

In an embodiment, server 120 may be implemented as a server executing on a single computer system. In other embodiments of the invention, such as the embodiment depicted by illustration 180 of FIG. 1B, server 120 may be implemented using two or more servers that are executing on two or more different computer systems. In illustration 180, communications from clients, sent over communications link 130, may be received by application router 150, which may subsequently route the communication to an appropriate server for processing. As the number of clients in system 100 increases, it may be advantageous to implement server 120 using a plurality of different server instances to promote scalability and fault tolerance. Also, one or more servers depicted in FIG. 1B may be dedicated for a particular task, such as processing requests from a single entity or business. For example, to ensure availability and speed of processing, one or more servers depicted in FIG. 1B may be dedicated to communicate with clients associated with a particular entity, such as a business or a logical business unit of a company.

Figure 2:
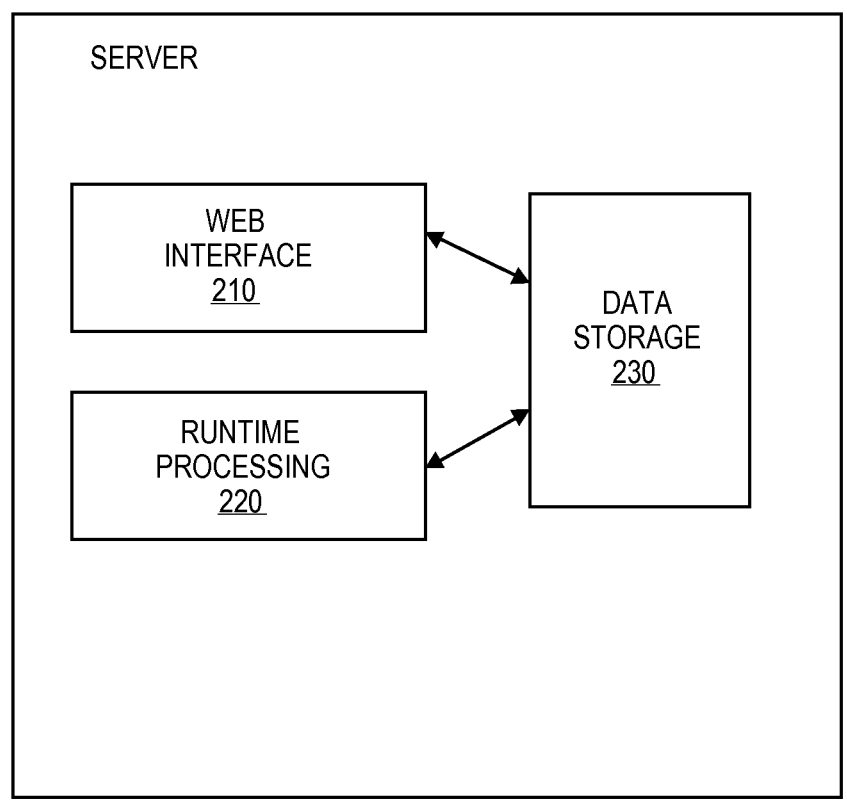
FIG. 2 is a high level block diagram of a server according to an embodiment of the invention.

FIG. 2 is a high level block diagram 200 of a particular server 120 according to an embodiment of the invention. The server shown in FIG. 2 may correspond to server 120 depicted in FIG. 1A or one of the many servers (such as server 1, server 2, or server N) depicted in FIG. 1B. As shown by FIG. 2, in an embodiment, a server comprises a web interface 210, a runtime processing component 220, and data storage 230.

Web interface 210 refers to a functional component which enables a person to define and record one or more security policies that govern the behavior of clients in system 100. For example, an owner of one or more clients may use a web browser to record policy data that describes or defines a security policy, and thereafter use the web browser to submit the policy data to web interface 210. Additional description about security policies, which may be defined and submitted to web interface 210, is provided below in the section entitled "Security Policies."

Runtime processing component 220, as broadly used herein, refers to any mechanism for processing communications, such as state messages, received from clients as well as communicating security policies and/or commands to one or more clients in system 100. Runtime processing component 220 may be implemented using software that is configured to perform the runtime functions of server 120.

Data storage 230, as broadly used herein, refers to any mechanism for persistently storing data. For example, data storage 230 may be implemented using a database management system (DBMS) which comprises one or more database servers and one or more databases.

Communications link 130 may be implemented by any medium or mechanism that provides for the exchange of data between a client, such as clients 102, 104, and 106, and server 120. Non-limiting, illustrative examples of communications link 130 include, without limitation, a network such as a Local Area Network (LAN), Wide Area Network (WAN), Ethernet or the Internet, one or more terrestrial, satellite or wireless links, and serial or parallel printer cables.

For a variety of reasons, the communications link 130 between a particular client, such as client 102, and server 120 may become intermittently unavailable. In particular, if the communications link 130 between client 102 and server 120 is implemented as a wireless link, at certain times the wireless link may be available and at other times the wireless link may not be available. For ease of explanation, in FIG. 1A communications link 130 is depicted between each client to server 120. However, those in the art shall appreciate that each client in system 100 may communicate with server 120 over a different type of communications link, e.g., client 102 may communicate with server 120 over a wireless link, client 104 may communicate with server 120 over a wired WAN, and client 106 may communicate with server 120 over a satellite link. Further, those skilled in the art will appreciate that, at times, a communications link between a particular client and the server may be unavailable at the same time that a communications link between another client and the server is available.

As shall be explained in further detail below, clients may use communications link 130 to transmit, to server 120, status messages, while server 120 may use communications link 130 to transmit, to one or more clients of system 100, security policies and/or commands. Having described an illustrative system 100 according to an embodiment of the invention, additional description about the possible operational states of agent 110 shall now be presented.

Agent States

Agent 110 operates to ensure that resources on the client upon which agent 110 resides are protected from theft and unauthorized access. Agent 110 may operate in a variety of different states. Each operational state of agent 110 reflects a different perceived threat level with respect to the theft and unauthorized access to resources of the client upon which agent 110 resides. To illustrate, consider FIG. 3A, which is a state diagram of agent 110 according to an embodiment of the invention. The operational state of agent 110 may change from time to time in response to differences in the perceived threat level to the client as perceived by agent 110. The actions performed by agent 110 may differ based on the current operational state of agent 110.

Initially, agent 110 may start in an enabled state 310. Enabled state 310 is a state that indicates that the client upon which agent 110 resides is operating as expected and no threats of theft or unauthorized access have been detected by agent 110. Thus, if the intended user of a client is using the client, then the client should be in enabled state 310.

If agent 110 determines that a condition is satisfied which suggests it would be appropriate for the current user of the client upon which agent 110 resides to authenticate him or herself to agent 110, then agent 110 will enter degraded state 320. An example of such a condition may be the expiration of an amount of time (referred to as the "Time to Disable" or "TTD"), determined by server 120, after which the current user of the client upon which agent 110 resides must authenticate him or herself to agent 110, e.g., by supplying a valid username/password combination or other such authentication credential. Degraded state 320 is a state that indicates that the client upon which agent 110 resides should prompt the user to authenticate himself to the client by submitting an authentication credential. If agent 110 is in degraded state 320, it does not necessarily follow that the client upon which agent 110 resides has been stolen or access in an unauthorized manner, degraded state 320 simply means that it is a possibility. Thus, in degraded state 320, agent 110 will attempt to determine whether the current user of the client is authorized to access the client by instructing the current user of the client to submit authentication credentials to agent 110. The amount of time that agent 110 should wait before entering degraded state 320 from enabled state 310 may be based on a security policy or may be based on a random or semi-random duration of time determined either by agent 110 or by server 120.

If the current user of the client is able to authentication himself as an authorized user of the client when agent 110 is in degraded state 320 after the expiration of a period of time, then agent 110 may, but need not, send a state message to server 120 to inform server 120 that the current user of the client has successfully authenticated himself to agent 110. The amount of time to allow the client to report and authenticate with server 120 when agent 110 is in degraded state 320 before agent 110 enters disabled state 330 is referred to as "Time to Trust" or "TTT." The specific amount of time that corresponds to the "Time to Trust" or "TTT" time may change based on the security policies provided by server 120 and stored by BIOS agent 112 on the client, as the amount of time may be adjusted to reflect the sensitivity of the data stored by the client. A shorter TTT time provides greater security than a longer TTT time; however, a shorter TTT time also increases the risk that a legitimate user may be inconvenienced because the client entered disabled state 330 before the legitimate user could authenticate himself to agent 110. The TTT time may be established by recording the TTT time in a policy stored by BIOS agent 112 at the client. After the current user of the client authenticates himself as an authorized user of the client when agent 110 is in degraded state 320, agent 110 returns to enabled state 310.

When agent 110 is in degraded state 320, the user may be challenged to prove his identify at a certain frequency. The frequency at which the user is challenged to prove his identity when agent 110 is in degraded state 320 is referred to as "Time to Challenge" or "TTC." As with the TTT time, the TTC time may be established by a policy stored by BIOS agent 112 at the client. The TTC time is independent of the TTT time. During the interval of time measured by the TTT value established by policy, the user of the client may be prompted to submit a valid authentication credential (for example, by submitting a valid operating system password) after each expiration of a period of time corresponding to the TTC time.

If the current user of the client is unable to authenticate himself as an authorized user of the client to agent 110, when agent 110 is in degraded state 320, then agent 110 will enter the disabled state 330. Disabled state 330 is a state that indicates that agent 110 has determined the client upon which agent 110 resides has been the subject to theft or an unauthorized access, and consequently, agent 110 disables the client. When a client is disabled, the client is unable to boot. Thus, if a malicious user attempts to operate a client having an agent 110 in disabled state 330, the malicious user will not be able to boot or otherwise use the client. In order for agent 110 to switch from disabled state 330 to enabled state 310, it may be necessary for an authorized user of the client, and/or personnel associated with the owner of the client, to supply, to agent 110, a key, digital certificate, authentication credential, or otherwise establish the fact that the client is in possession of an authorized party.

Figure 3A:
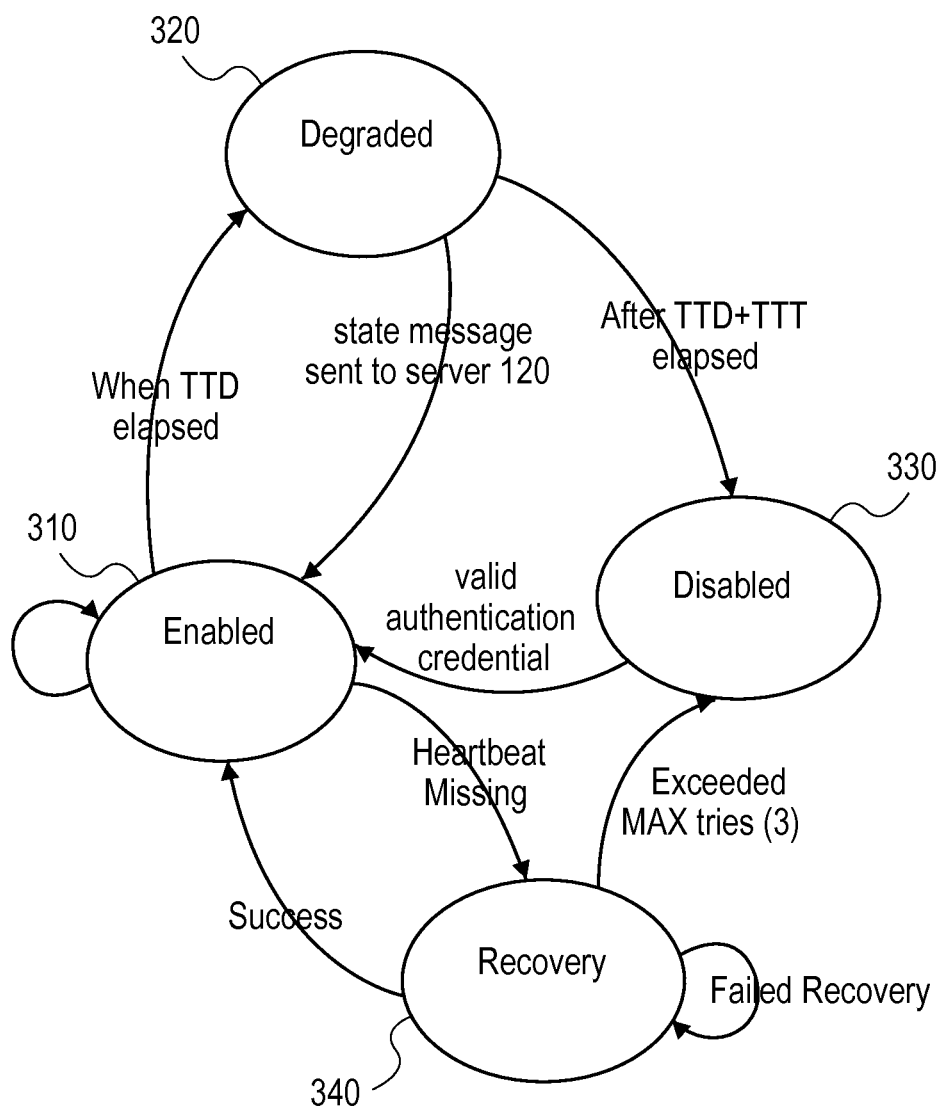
FIG. 3A, which is a state diagram of an agent according to an embodiment of the invention.

If agent 110 determines that a condition is satisfied which might indicate the client has been compromised in some fashion when agent 110 is in enabled state 310, then agent 110 will enter recovery state 340. An example of such a condition may be BIOS agent 112 not receiving a heartbeat message from operating system agent 114 after an expected period of time. Recovery state 340 is a state that indicates that agent 110 has detected a condition that suggests the client upon which agent 110 resides is stolen or being accessed in an unauthorized manner, but agent 110 is not yet ready to conclude so. In recovery state 340, the current user of the client may be provided an opportunity to authenticate him or herself to agent 110; additionally, agent 110 will monitor resources of the client when agent 110 is in recovery state 340, and if additional evidence surfaces to suggest that the client has been stolen or compromised, then agent 110 will enter disabled state 330. In recovery state 340, the user may be provided a limited opportunity to authenticate him or herself to agent 110. For example, as depicted in FIG. 3A, after three failed attempts by the user to authenticate him or herself, agent 110 enters disabled state 330. Note that the maximum number of failed attempts to allow before agent 110 moves from recovery state 340 to disabled state 330 may be established by a policy stored at the client. While FIG. 3A depicts a maximum number of three failed attempts before agent 110 moves from recovery state 340 to disabled state 330, this number is merely exemplary, as other embodiment of the invention may establish a different number of maximum failed authentication attempts before agent 110 moves from recovery state 340 to disabled state 330.

Figure 3B:
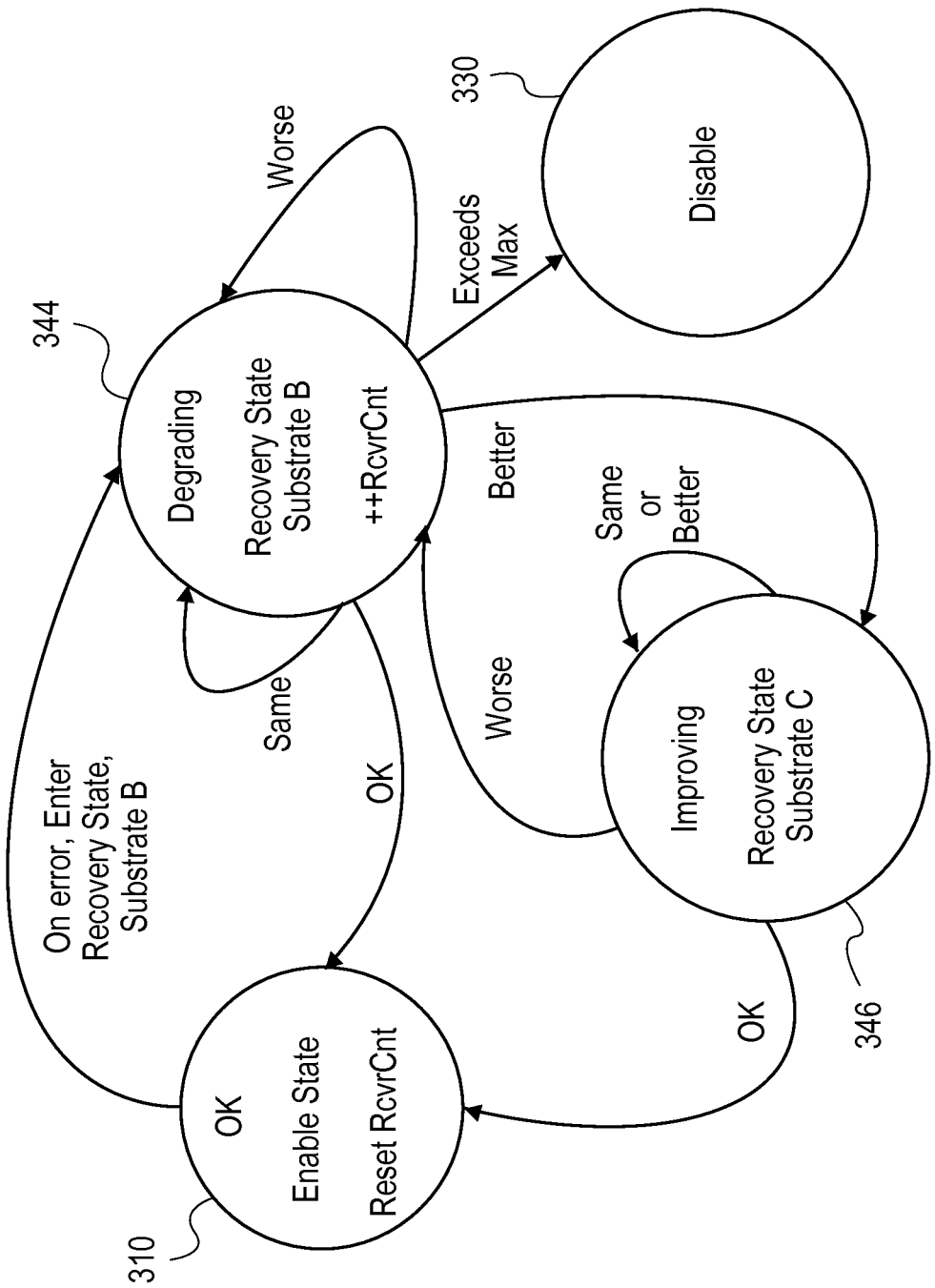
FIG. 3B is a state diagram that includes additional details of the recovery state according to an embodiment of the invention.

Embodiments of the invention may implement the operational states of agent 110 differently than that discussed above with reference to FIG. 3A. For example, certain embodiments may implement agent 110 such that one or more operational states discussed above with respect to FIG. 3A may contain two or more sub-states. To illustrate, consider FIG. 3B, which is a state diagram that includes additional details of recovery state 340 according to an embodiment of the invention. In the embodiment depicted by FIG. 3A, when agent 110 enters recovery state 340, agent 110 enters recovery sub-state 344 shown in FIG. 3B. When agent 110 enters recovery sub-state 344, agent 110 monitors the resources of the client and determines if the conditions that suggest a theft or unauthorized access has occurred improve, stay the same, or grow worse. If such conditions improve, then agent 110 may move to recovery sub-state 346 as shown in FIG. 3B, and if such conditions improve further, then eventually agent 110 enters enable state 310. However, if agent 110 is in recovery sub-state 344, and if conditions that suggest a theft or unauthorized access have occurred stay the same or grow worse, then a counter is incremented, and agent 110 remains in recovery sub-state 344. If the counter exceeds a threshold value, then agent 110 enters disable state 330. As the threshold value for the counter may be set by policies provided by server 120 and stored by agent 110, the operation of agent 110 (for example, how many opportunities agent 110 is provided before moving from recovery sub-state 344 to disable state 330) may be adjusted accommodate different balances between the need to provide a secure environment and the need to not be overly restrictive with user behavior.

The particular operational state which agent 110 is currently in reflects the current perceived threat level to the client. To ensure that malicious users cannot compromise agent 110, agent 110 has been designed to resist tampering and interference from unauthorized users, as shall be explained in more detail in the next section.

Securing the Bios Agent from Unauthorized Access

Embodiments of the invention protect resources, stored on a client, from theft and unauthorized access. Advantageously, the BIOS of each client in system 100 comprises BIOS agent 112. The BIOS is responsible for booting the client and starting the client system and its components, such as CPU and memory. The BIOS has two portions, a boot portion and a runtime portion. The boot portion of the BIOS is responsible for activities involved in booting the client, while the runtime portion of the BIOS is responsible for ongoing activities after the client has booted. In an embodiment, BIOS agent 112 communicates and interacts with the runtime portion of the BIOS.

By implementing BIOS agent 112 within the BIOS of each client of system 100, it is very hard for a party to circumvent, disable, or disengage the protection offered by embodiments of the invention. As shall be explained below, BIOS agent 112 is implemented in a manner that protects a party from circumventing, disabling, or disengaging BIOS agent 112. Further, BIOS agent 112 performs functions which protect resources of the client as well as the operating system agent 114.

It is important to secure BIOS agent 112 from tampering and interference from unauthorized users, as BIOS agent 112 stores policy data that describes the security policies which agent 110 follows. In an embodiment, the BIOS, and therefore BIOS agent 112, may be stored on a special microchip located on the motherboard of a client. The microchip is designed to ensure that the BIOS cannot be accessed by unauthorized parties. To achieve this goal, the microchip may be designed such that data stored on the microchip is (a) encrypted and (b) cannot be overwritten.

In an embodiment, BIOS agent 112 securely stores certain types of data in a manner that preserves the data through power cycles, disk re-formatting, software reinstallation, BIOS reflashing, and the like. For this purpose, BIOS agent 112 may maintain a small database, referred to as a Secure Data Memory (SDM), in the BIOS Flash Memory (EEPROM). Information stored in the SDM includes information about client provisioning from the manufacturing process, the BIOS agent 112 installation process, and the BIOS agent 112 registration process with server 120, including but not limited to a unique client identifier generated by server 120, password(s) for authentication and session keys, server identifier, application router domain name, and timeout limits. Additionally, the SDM may store information about the current operating state of BIOS agent 112, the status of recovery of the client, and/or information about the heartbeat message(s) communicated from operating system agent 114 to BIOS agent 112.

To maintain security, data in the SDM must be protected from intentional and unintended disclosure. BIOS agent 112 may encrypt data stored in the SDM which must not be disclosed. Similarly, none of the data stored in the SDM should be capable of being altered by a rogue software application. The BIOS Flash Memory meets these requirements, as it is a secure data storage area which may only be accessed and altered by authorized BIOS programs.

SDM may be implemented in a reserved area of Flash Memory and afforded the protection that it offers. Flash Memory is different from normal RAM memory in two significant ways. First, memory access is much slower. Second, there are a finite number of times that flash memory can be rewritten. To compensate, certain flash memory microchips have built-in means for "moving" data to different areas of memory. In an embodiment, BIOS agent 112 may further address the limit on the number of times flash memory may be rewritten by allocating multiple records, and when the limit is about to be reached in a first record, the contents of the first record are copied to a second record and the current-record pointer is updated to reference the second record.

In an embodiment, to ensure that BIOS agent 112 is implemented such that (a) BIOS agent 112 is prevented from being overwritten and/or deleted, and (b) BIOS agent 112 encrypts data to prevent unauthorized parties from reading the code and/or data that comprises BIOS agent 112, BIOS agent 112 may be implemented using an approach referred to as "SecurePhlash," which is described in U.S. patent Ser. No. 11/026,813, entitled "Secure Firmware Update," filed by Andrew Cottrell et al. on Dec. 28, 2004, the contents of which are herein incorporated by reference as if fully set forth herein. SecurePhlash may be used to ensure that BIOS agent 112 cannot be disabled without manually altering or changing the physical components of the client upon which BIOS agent 112 resides. SecurePhlash requires that a user to provide not only the contents (i.e., bit patterns) to be reflashed, but the proper certificates of signature to ensure that the BIOS can only be reflashed by authorized parties. Passing this hurdle allows re-flashing to process in a system/chip mode that is only available to the BIOS, and thus, applications are unable to gain the necessary access to overwrite the contents of a portion of Flash Memory. SecurePhlash also provides the capability for excluding blocks of BIOS Flash Memory from being re-flashed, thereby providing a one-time only flash capability.

In another embodiment of the invention, the BIOS, and by extension BIOS agent 112, may be encrypted using a published specification called Trusted Platform Module (TPM) by Trusted Computing Group. Other embodiments of the invention may employ different approaches for encrypting data in the BIOS, as SecurePhlash, TPM, or other methods known to those skilled in the art may be employed.

As described above, BIOS agent 112 is implemented within the BIOS of each client of system 100, thereby making it very hard for a party to circumvent, disable, or disengage the protection offered by embodiments of the invention. The next section describes, at a high-level, how the protection offered by system 100 operates.

Protecting Resources of the Client

Figure 4:
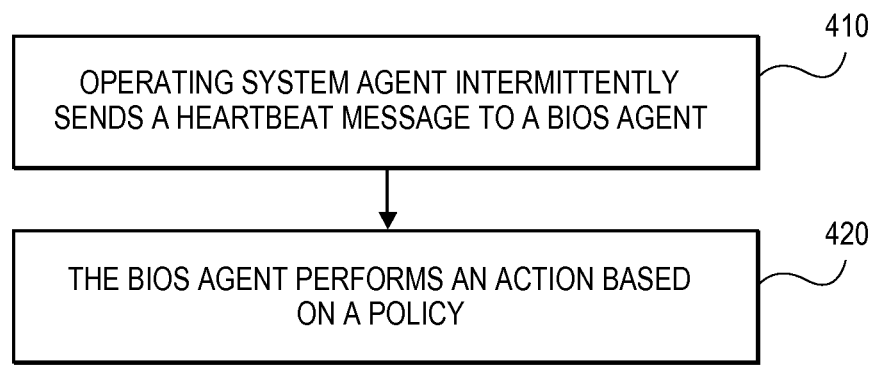
FIG. 4 is a flowchart illustrating the functional steps of protecting resources of a client according to an embodiment of the invention.

FIG. 4 is a flowchart illustrating the high-level functional steps of protecting resources of a client according to an embodiment of the invention. In step 410, operating system agent 114 intermittently sends a heartbeat message to BIOS agent 112. A heartbeat message is a communication that describes the operational state of operating system agent 114. As operating system agent 114 monitors resources of the client to detect any malicious or unauthorized activity, the operational state of operating system agent 114 reflects whether any resources of the client has been subjected to any unauthorized activity. The process of operating system agent 114 generating the heartbeat message is explained in further detail below in the section entitled "Examining Modules and Forming the Heartbeat Message."

Thereafter, in step 420, BIOS agent 112 performs an action based on a policy. The one or more policies which BIOS agent 112 follows are described by data (denoted "policy data") that is stored within the BIOS. A policy may specify that BIOS agent 112 is to perform a certain action in response to either (a) a particular operational state described by the heartbeat message, or (b) BIOS agent 112 not receiving the heartbeat message after an expected period of time.

As an example of the type of policy which BIOS agent 112 may follow, if the heartbeat message received by BIOS agent 112 indicates that a module of operating system agent 114 has been deleted, then the policy may interpret that as an indication of a malicious attack, and the policy may instruct BIOS agent 112 to perform one or more actions to address the malicious attack, such as disabling the client upon which BIOS agent 112 resides, emitting a loud sound to alert nearby persons that an unauthorized use of the client is occurring, and/or requiring the user of the client upon which BIOs agent 112 resides to resubmit authentication credentials to the client to continue use of the client. As another example of an illustrative policy which BIOS agent 112 may follow, if no heartbeat message is received by BIOS agent 112 after an expected period of time, then the policy may interpret that as an indication that operating system agent 114 has been compromised and is unable to send the heartbeat message, and the policy may instruct BIOS agent 112 to perform one or more actions to address the situation. Additional description of the nature of the policies of which BIOS agent 112 may follows is provided below in the section entitled "Security Policies."

Having described the high-level functional steps of protecting resources of a client according to an embodiment of the invention, additional details about how operating system agent 114 monitors resources of the client and how operating system agent 114 generates the heartbeat message in step 410 will now be presented.

Operating System Agent Operation

Operating system agent 114 may be responsible for, among other functions, monitoring the resources of the client upon which it is implemented, generating a heartbeat, and sending the heartbeat to BIOS agent 112. There are a variety of ways in which operating system agent 114 may be implemented. To provide a description about how operating system agent 114 may operate according to one embodiment of the invention, reference will be made to FIG. 5A, which is a block diagram 500 of the functional components of operating system agent 114 according to an illustrative embodiment of the invention. Note that in other embodiments of the invention, operating system agent 114 may comprise a different set of functional components, as certain functional components of operating system agent 114 depicted in FIG. 5A are optional or may be combined with one or more other functional components.

Figure 5A:
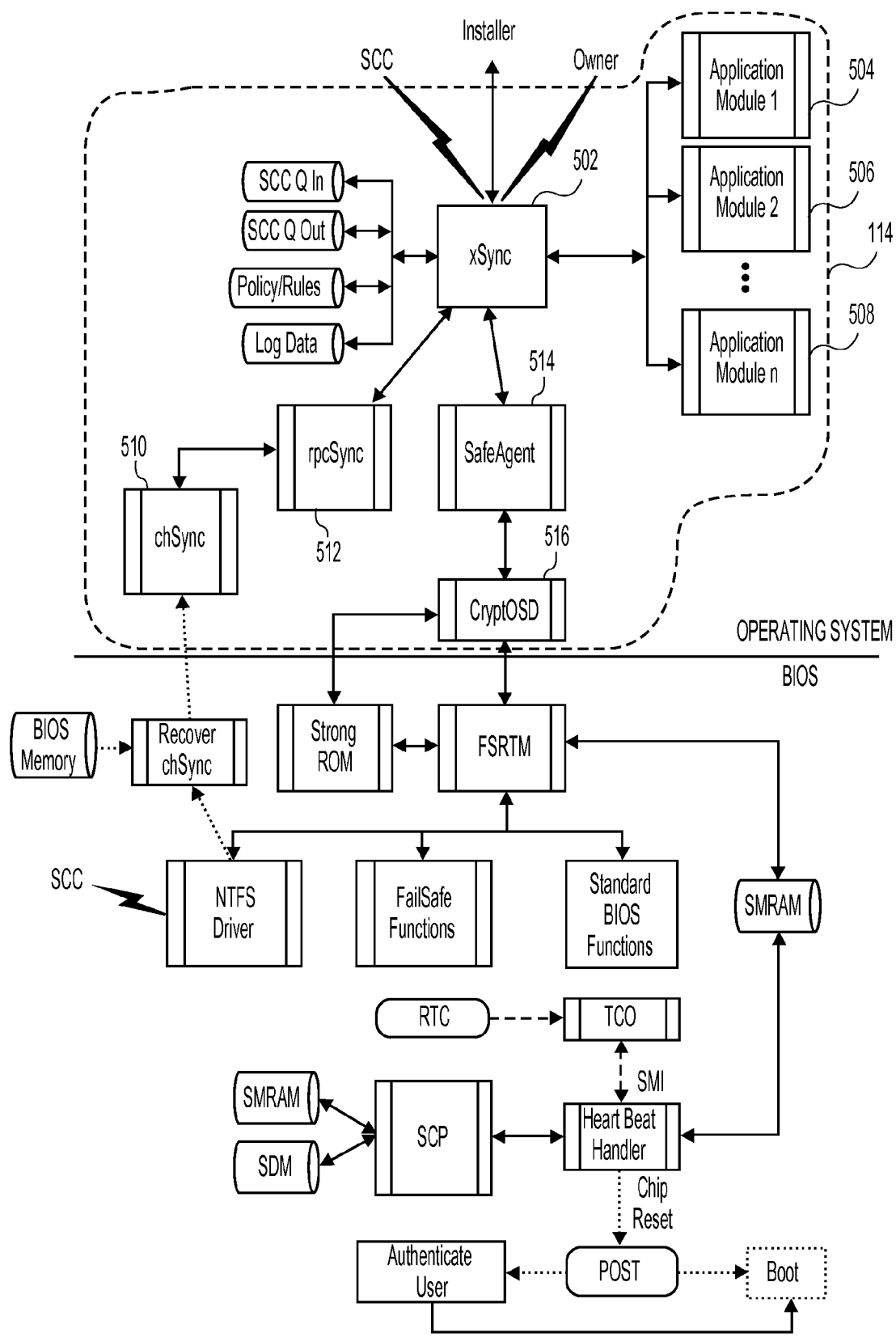
FIG. 5A is a block diagram of the functional components of an operating system agent according to an embodiment of the invention.

As shown in FIG. 5A, in an embodiment, operating system agent 114 comprises xSync module 502. xSync module 502 operates as a communications hub for operating system agent 114. xSync module 502 communicates with all of application modules 504, 506, and 508. xSync module 502 also handles all communications with server 120, the owner of the client, and the user of the client. xSync module 502 is also responsible for the installation and updating of the components of operating system agent 114. xSync module 502 is also responsible for periodically forming a portion of the heartbeat message, generated by operating system agent 114; xSync module 502 checks the status of application modules 504, 506, and 508, and subsequently generates a portion of the heartbeat message that reflects the status of application modules 504, 506, and 508.

In an embodiment, operating system agent 114 comprises one or more application modules, such as application modules 504, 506, and 508. While three application modules are depicted in the embodiment shown by FIG. 5A, operating system agent 114 may comprise any number of application modules. An application module performs a functional operation, such as a command and/or control operations sent from server 120 and received by operating system agent 114 or an action that is dedicated by a policy.

Non-limiting, illustrative examples of the functions which a particular application module may perform include (a) encryption and backup services, (b) fetching the client's hardware and software configuration and identification information, (c) taking pictures or video with the client's webcam, (d) performing anti-theft functionality, such as disabling the client, emitting an alarm, and/or displaying a stolen alert screen, (e) deleting or removing files or resources stored on the client, (f) gathering forensic data, such as capturing the user's keystrokes, (g) retrieving files and/or resources from the client and bundling the files and/or resources (for example, by creating a .zip file) for xSync module 502 to upload to server 120 (possible via the FTP protocol), (h) preparing and registering components of operating system agent 114 (such as xSync module 502 or a particular application module) with server 120, and (i) detecting and fetching global positioning service (GPS) information.

chSync module 510 periodically forms a portion of the heartbeat message. chSync module 510 is also responsible for determining whether rpcSync module 512 is installed and uncorrupted, and if not, chSync module 510 is responsible for installing rpcSync module 512. The operation of chSync module 510 is explained in more detail below in the section entitled "Examining Modules and forming the Heartbeat Message."

rpcSync module 512 starts executing at boot time and monitors for the presence of xSync module 502. If xSync module 502 is not running, then rpcSync module 512 will install and/or restore xSync module 402. rpcSync module 512 may form a portion of the heartbeat message based upon whether xSync module 502 is present and/or executing.

SafeAgent module 514 periodically forms the heartbeat message from the portions of the heartbeat message that are created by other components of operating system agent 114. After forming the heartbeat message, SafeAgent module 514 stores the heartbeat message, in SMRAM, which is part of BIOS agent 112.

CryptOSD module 516 the main interface of all components of operating system agent 114 with BIOS agent 112.

Note that the above discussion of the embodiment of operating system agent 114 depicted in FIG. 5A is merely illustrative of one embodiment. Other embodiments of the invention may implement operating system agent 114 differently. For example, other embodiments of the invention may implement modules or functions described herein as being performed by operating system agent 114 such that they are performed by BIOS agent 112, and vice-versa.

Additional details about how operating system agent 114 monitors the resources of the client upon which it is implemented, generates a heartbeat, and sends the heartbeat to BIOS agent 112 will now be presented.

Examining Modules and Forming the Heartbeat Message

The heartbeat message, generated by operating system agent 114 and communicated to BIOS agent 112, describes an operational state of operating system agent 114. As operating system agent 114 monitors the health of resources of the client, the operational state of operating system agent 114 is a reflection of the health of resources of the client. The content of the heartbeat message reflects whether normal operations of the client have been compromised or degraded. Agent 110 is a self-monitoring system which dynamically and continuously ensures that resources of the client are present and have not been subject to tampering and that agent 110 is operating correctly, and if not, is able to repair or recover itself. The heartbeat message, as shall be explained in more detail below, informs BIOS agent 112 about the operational state of operating system agent 114. As a result, BIOS agent 112 may take an appropriate action, using upon one or more security policies, based upon the content of a heartbeat message or upon not receiving a heartbeat message after an expected duration of time (which suggests that operating system agent 114 is unable to send the heartbeat message to BIOS agent 112).

The heartbeat message comprises several parts that are derived independent of each other. Periodically, various modules (denoted "examining modules") of operating system agent 114 examine the condition of other modules, and their associated files, of operating system agent 114 to determine if they are present as installed and operating as intended. This may be the only function performed by a particular examining module or the function may be performed in addition to other functions for which the examining module is also responsible. Each examining module of operating system agent 114 performs these checks for a subset of modules of operating system agent 114 and, for redundancy purposes, some modules of operating system agent 114 may be checked by more than one examining module. Furthermore, an examining module is treated like any other module of operating system agent 114, and therefore, may be examined by other examining modules of operating system agent 114. The number of examining modules in operating system agent 114 is a design decision based on the implementation of operating system agent 114. If there are too few examining modules in operating system agent 114, then it is potentially easier to defeat the protection provided by operating system agent 114; on the other hand, too many examining modules in operating system agent 114 may make implementation cumbersome.

Figure 6A:
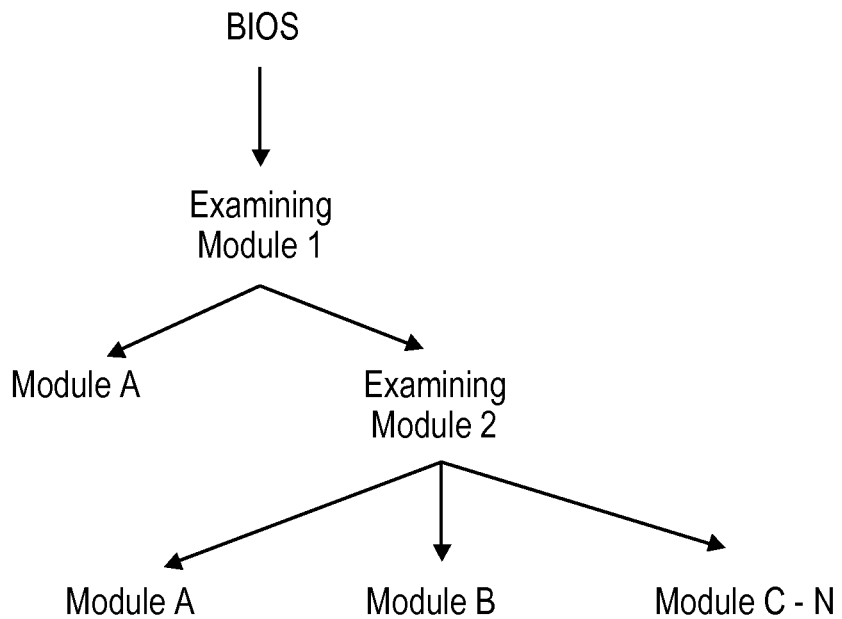
FIG. 6A is an illustration of a high-level approach for implementing examining modules according to an embodiment of the invention.

A high-level approach for implementing examining modules according to an embodiment of the invention is depicted in illustration 600 of FIG. 6A. In the approach depicted by FIG. 6A, the BIOS checks an examining module, namely examining module 1, capable of restoring the entire operating system agent 114. In the embodiment depicted in FIG. 6A, operating system agent 114 consists of modules A-N. Examining module 1 is capable of restoring module A and examining module 2, which is capable of restoring modules A, B, and C-N.

Figure 6B:
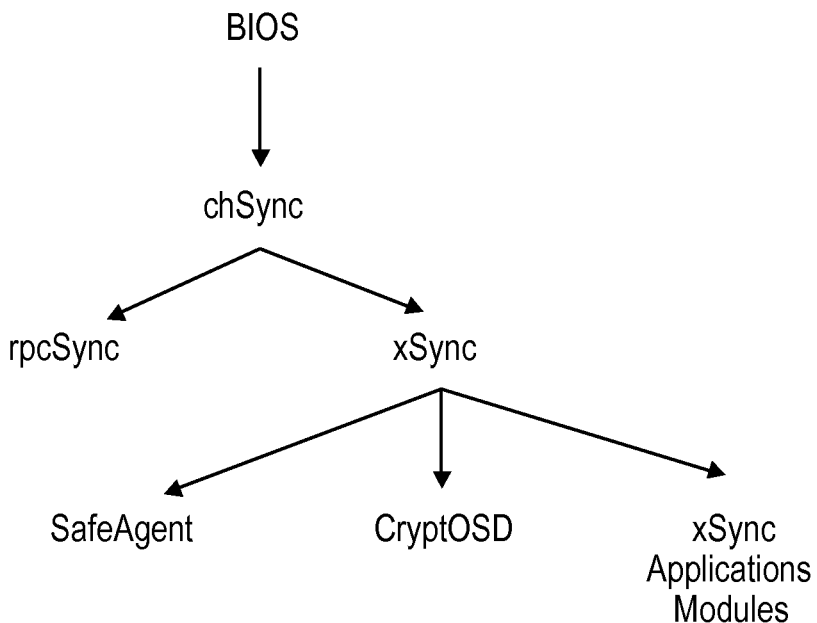
FIG. 6B is an illustration of another example of implementing examining modules according to an embodiment of the invention.

A more specific example of implementing examining modules, based on the operating system agent shown by FIG. 5A, is illustrated by FIG. 6B. In the embodiment of FIG. 6B, the BIOS will check to see that chSync module 410 is operating correctly and all of its associated files are present and uncorrupted. If the BIOS determines that chSync module 410 does not pass this examination, then agent 110 enters recovery state 340. However, if the BIOS does determine that chSync module 410 passes this examination, then chSync module 410 checks the process and file status of rpcSync module 412 and xSync module 402 and records their status for SafeAgent module's 414 use in forming the heartbeat message. xSync module 402 also checks the process/file status of SafeAgent module 414, CryptOSD module 416, and all xSync applications modules 404, 406, and 408 and records their status for SafeAgent module's 414 use in forming the heartbeat message.

An examining module will check a number of other modules to ensure their processes and associated files are present and have not been corrupted. If a process is determined to be absent or corrupted, the examining module will re-establish it from its associated file if possible. If the associated file is absent or corrupted, a request will be made to server 120 to recover the appropriate file. The result of this examination, made by all examination modules, is summarized, saved, and becomes part of the heartbeat message. The details of the examination are recorded in a module status table (MST) which contains an entry for each examination module. SafeAgent module 414 assembles the heartbeat message using the information in the module status table and sends the heartbeat message to BIOS agent 112 for storage in the SMRAM.

Thus, the only way to circumvent the protection provided by agent 110 is to physically alter the client, because if portions of agent 110 are deleted or corrupted, they will be reinstalled or recovered by portions of agent 110 that reside in a portion of the BIOS which cannot be accessed except by authorized personnel.

The Content of the Heartbeat Message

A healthy client is a client that exhibits no signs or evidence of theft or unauthorized access. A healthy client has all of appropriate processes executing in an uncorrupted manner as well as has all of its files (particularly its executable files, such as a file with an ".ex" extension) present and uncorrupted. An uncorrupted process or file is one that passes a security check, such as having a valid digital signature or a valid cyclic redundancy check (CRC). The heartbeat message generated by operating system agent 114 may identify the "health" of the client upon which operating system agent 114 resides.

A heartbeat message may be implemented in a variety of different ways. According to one embodiment, the heartbeat message contains information that identifies, for a particular module or component of operating system agent 114, whether the module or component is present and uncorrupted. Such an embodiment may indicate whether a particular module or component of operating system agent 114 is executing and is uncorrupted as well as indicating whether all files associated with the module or component are present and uncorrupted.

According to another embodiment, additional information that describes the nature of the potential security threat(s) may be contained in the heartbeat message. For example, if a particular module of operating system agent 114 is moved or deleted every five minutes, then this additional information may be contained within the heartbeat message. Such additional information may provide additional insight into potential security threats, and may be referenced by a security policy. For example, a particular security policy may be established that states that if the same file or resources is deleted three times in a particular time period (which is suggestive of a malicious attack on the client), then agent 110 should enter the disable state 330.

If the heartbeat identifies any evidence of theft or unauthorized access, then when BIOS agent 112 receives the heartbeat, BIOS agent 112 follows security policies stored by BIOS agent 112 to address the potential theft or unauthorized access. The security policies followed by BIOS agent 112 may strike a balance between maintaining the integrity of agent 110 (and by extension the resources of the client upon which it resides) and the convenience of the user of the client, as locking the client due to the accidental deletion of a file could be a major inconvenience for the user In an embodiment, if a process or file is removed, then agent 110 will follow security policies stored by BIOS agent 112 to determine how to address the situation. For example, a particular security policy may instruct agent 110 to enter recovery state 340 if a process or file is removed or corrupted. In recovery state 340, agent 110 may attempt to communicate with server 120 to restore the particular process or file that has been removed. For example, server 120 may be able to provide agent 110 with a new version of the process or file that has been corrupted or removed. If the missing resources is a low priority resource, and a connection to server 120 cannot be established by agent 110, a security policy may instruct agent 110 to continue and to defer recovery of the missing resource; however, care should be given to defining security policies, as when a process and its corresponding executable file are missing, it is unlikely to be accidental.

While agent 110 is in recovery state 340, agent 110 monitors resources of the client for further degradation. Any further degradation of resources of the client is most likely an indication of malicious intent, as a consequence, it is addressed by agent 110 in accordance with the security policies stored by BIOS agent 112 and established by the owner of the client. For example, according to an exemplary security policy, if agent 110 determines that resources of a client have continued to degrade while agent 110 is in recovery state 340, then agent 110 may enter disable state 330. Although the behavior of agent 110 when agent 110 is in disable state 330 may differ according to the particular security policies stored by agent 110, a typical behavior of agent 110 when agent 110 is in disable state 330 is to "lock" the client by preventing anyone to access the client without providing two or more levels of authentication to "unlock" the client.

Additional details will now be provided about the operation of BIOS agent 112.

Bios Agent Operation

Figure 5B:
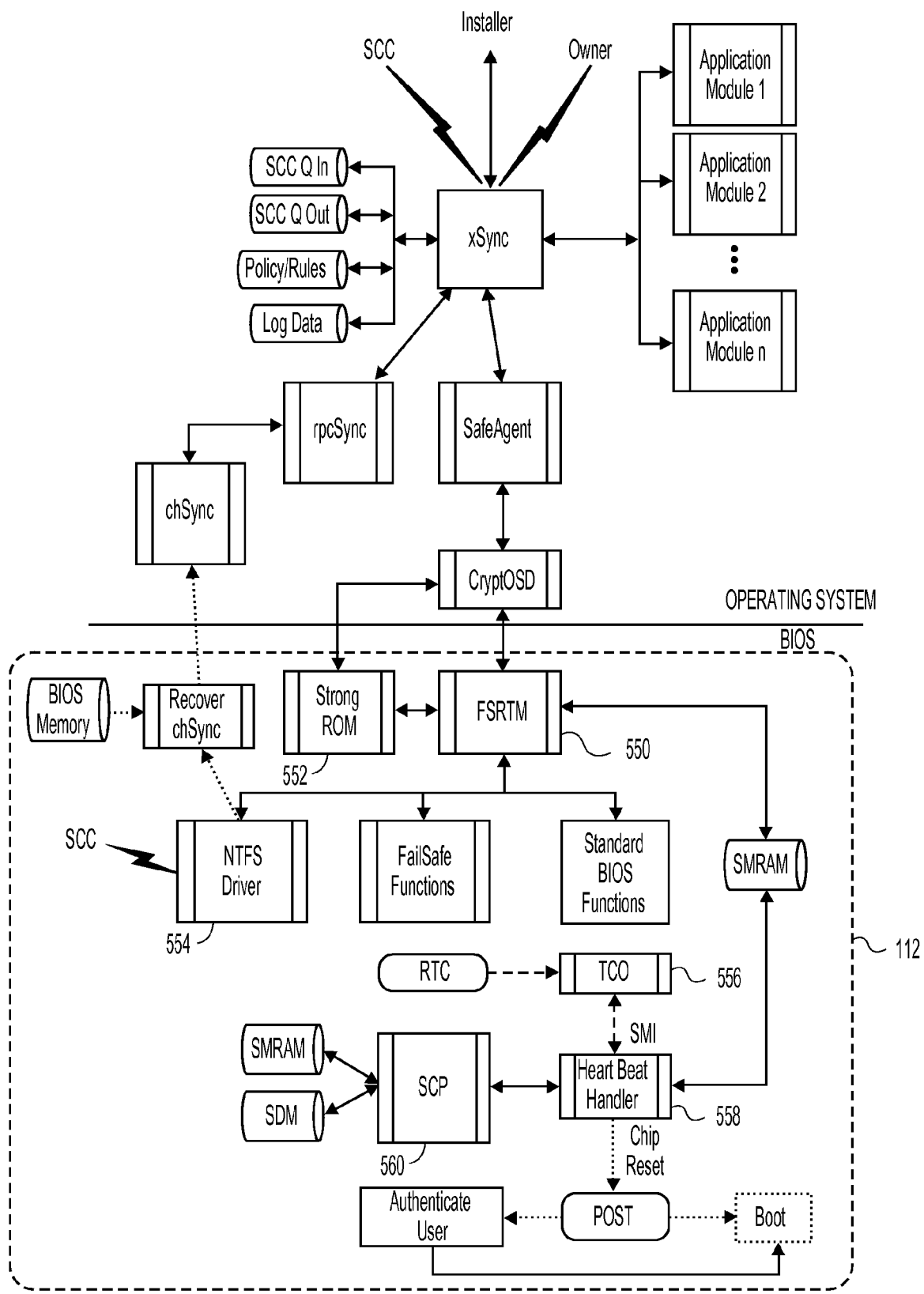
FIG. 5B is a block diagram of the functional components of a BIOS agent according to an embodiment of the invention.

FIG. 5B is a block diagram of the functional components of BIOS agent 112 according to an embodiment of the invention. BIOS agent 112 receives the heartbeat message from operating system agent 114 and stores security policies which agent 110 receives from server 120. Additionally, BIOS agent 112 performs one or more actions in accordance to the security policies. For example, BIOS agent 112 may perform an action, dictated by a security policy, in response to either (a) the contents of a received heartbeat message, or (b) BIOS agent 112 not receiving the heartbeat message after an expected period of time.

BIOS agent 112 may be implemented in a variety of different ways. To illustrate how BIOS agent 112 may be implemented according to an embodiment of the invention, consider FIG. 5B, which is a block diagram of BIOS agent 112 according to an embodiment of the invention. As illustrated by FIG. 5B, in an embodiment BIOS agent 112 includes FSRTM module 550. FSRTM module 550 serves as the primary interface for modules of operating system agent 114 to communicate with BIOS agent 112. FSRTM module 550 evaluates all communications received from modules of operating system agent 114 to ensure that the communications originated from a valid module of operating system agent 114 as well as routes valid communications, from modules of operating system agent 114, to their appropriate destination within BIOS agent 112.

Strong ROM 552 provides security services for the BIOS of the client upon which it resides. In particular, Strong ROM 552 may be used to provide encryption/decryption functionality as well as authentication functionality. Strong ROM 552 may be implemented as a binary module which executes in system management mode (SMM) inside SMRAM. Strong ROM 552 provides authentication and cryptographic services, including authentication of binary modules and caller validation for applications that access firmware services. Strong ROM 552 is an illustrative example of BIOS security services, but it is contemplated that other security services may be used by other embodiments of the invention. For example, a client may be implemented with other approaches for performing encryption/decryption and/or authentication.

NTFS Driver 554 is a module that is responsible for copying chSync module 510 and other associated files to the operating system.

TCO 556 is a timer which is used to determine when BIOS agent 112 will examine the recent heartbeat message received from operating system agent 114.

Heartbeat handler 558 is responsible for examining the heartbeat message received from operating system agent 114. Heartbeat handler 558 may either reset the heartbeat message or take remedial action depending on the nature of the changes in the heartbeat message.

State change processor (SCP) 560 is a module which examines the changes in the heartbeat message received from operating system agent 114, the current state of agent 110, and takes appropriate action depending on the security policies established by the owner of the client.

As BIOS agent 112 acts upon policies and instruction received from server 120, additional detail will now be provided about how a client and server 120 may interact.

Interations Between Clients and the Server

Figure 7:
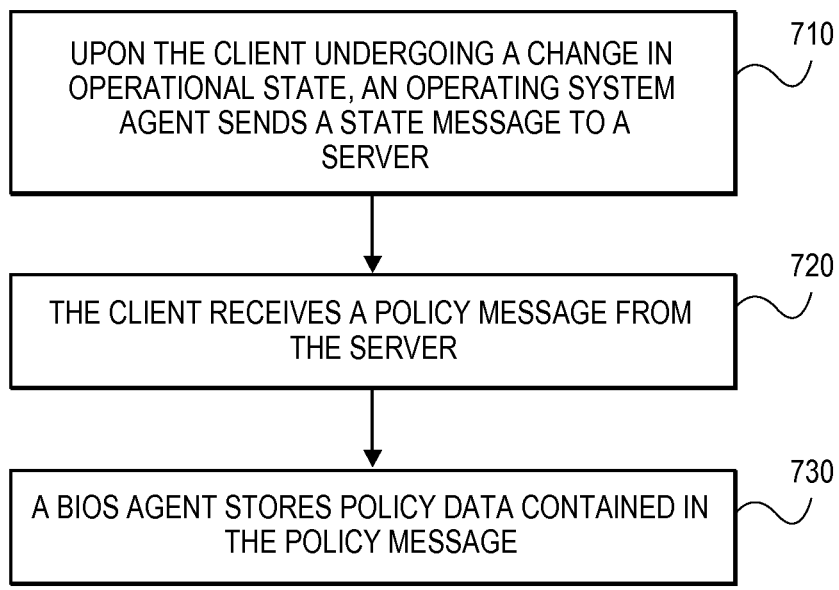
FIG. 7 is a flowchart illustrating the functional steps of communicating a policy from a server to a client according to an embodiment of the invention.

FIG. 7 is a flowchart illustrating the functional steps of communicating a policy from server 120 to a client according to an embodiment of the invention. The steps of FIG. 7 may be used to ensure that agent 110, residing on a client, possesses the latest security policies issued by the owner of the client. Additionally, the steps of FIG. 7 also ensure that a party external to each client in system 100, namely sever 120, maintains accurate information about the status of each client so that the owners of each client may be apprised. For purposes of providing a clear explanation, the steps of FIG. 7 shall be explained below with reference to agent 110 executing on client 106.

In step 710, upon client 106 undergoing a change in operational state, operating system agent 114, executing on client 106, sends a state message to server 120. The state message describes a new operational state of client 106. Clients in system 100 periodically contact server 120 whenever the client undergoes a change that may affect its operation or present a change in the risk of theft or unauthorized access of the client. Non-limiting, illustrative changes which may result in client 106 sending a state message to server 120 include a change in the IP address of client 106, a change to the hardware configuration of client 106, a change to the software configuration of client 106, a toggling of the power supplied to client 106, a change to a configuration setting of client 106, a change in client 106 physical location (such as a global position service (GPS) indicating that client 106 has moved outside of a bounded geographical region), and a change in the heartbeat message received by BIOS agent 112 from operating system agent 114.

Server 120 stores the information contained in the state message. Server 120 also examines any policies that affect client 106 to determine what, if any, action(s) should be performed by server 120 in response to receiving the state message from client 106. An applicable policy may result in a command being sent from server 120 to client 106 that affects the mode of operation of client 106, such as disabling some function of client 106 (for example, the USB ports of client 106). In more serious situations, server 120 may instruct agent 110 executing on client 106 to change its state to disable state 330, and force client 106 to reset, reboot, and enter a mode that requires multi-level user authentication.

Server 120 may periodically determine if there are any pending policy changes to send to a client, and if so, send a policy message containing the new policies to the client. In an embodiment, server 120 may determine if there are any pending policy changes to send to client 106 in response to receiving a state message from client 106.

In step 720, client 106 receives a policy message from server 120. The policy message is a communication, sent over communications link 130, which contains policy data which identifies one or more security policies which client 106 is to follow. In an embodiment, the owner of client 106 may establish the security policies using web interface 210 of server 120.

In step 730, agent 110 of client 106 stores the policy data, received from server 120, in the BIOS of the device. As a result, the security policies which client 106 is to follow is stored in a secure location which is protected from unauthorized access.

Clients may Follow Security Policies without Aid of the Server

Client 106 is not dependent on server 120 for protecting the clients' data from loss and/or disclosure. Without being connected to server 120 the client is able to determine its state, changes to its state, and according to the polices established by the owner, react to those changes, which may include entering a disable state which requires multi-level authentication before the client can re-boot and resume operations.

Figure 8:
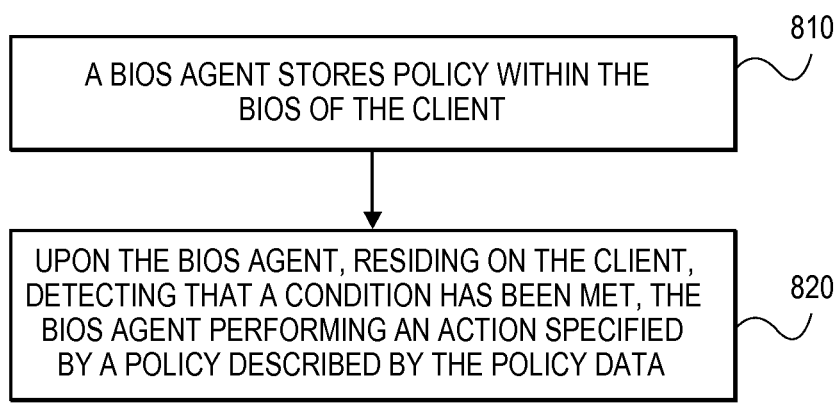
FIG. 8 is a flowchart illustrating the functional steps of securing a device according to an embodiment of the invention.

FIG. 8 is a flowchart illustrating the functional steps of securing a device according to an embodiment of the invention. By performing the steps illustrated by FIG. 8, a client may protect its resources from loss and/or disclosure by following security policies stored in the BIOS of the client. For ease of explanation, the steps of FIG. 8 shall be described below with reference to client 106.

In step 810, client 106 stores policy data within the BIOS of client 106. The policy data describes one or more security policies which client 106 should follow. Client 106 may receive the policy data in a policy message from server 120 as described above with reference to step 720.

In step 820, upon bios agent 112 of client 106 detecting that a certain condition, specified by a particular security policy, has been met, BIOS agent 112 of client 106 performs one or more actions specified by the particular security policy. Advantageously, if a malicious user steals client 106 or accesses client 106 in an unauthorized manner, agent 110 may protect resources of client 106 without any assistance or communication from server 120. For example, the security policies stored in the BIOS of client 106 may indicate that, upon detecting signs that client 106 has been stolen, agent 110 should turn client 106 "into a brick," that is to say, prevent client 106 from being able to boot, thereby rendering client 106 inoperable but protecting the data stored thereon from unintended disclosure to a malicious party.

Security policies are discussed in greater detail below in the section entitled "Security Policies." Additional information about the types of actions that a client may perform is presented below in the section entitled "Illustrative Commands that a Client may Perform." Also, discussion about the types of conditions that a security policy may reference is presented below in the section entitled "Illustrative Conditions that may be Referenced by a Security Policy."

Security Policies

A security policy, as used herein, refers to a policy which a client of system 100 may follow to protect the resources of the client from theft and/or unauthorized access. A client in system 100 may follow any number of security policies. The security policies which a client of system 100 follows are stored in the BIOS of the client.

A security policy may initially be defined using web interface 210 of server 120. For example, the owner of a client (which may correspond to a company and may be, but need not be, different than the intended user of a client) may use a web browser to define one or more security policies, and may submit the defined one or more security policies to server 120 via web interface 210.

In an embodiment, a security policy specifies that one or more actions are to be performed by a client if one or more conditions are met. A condition referenced by a security policy serves to indicate when a particular action is performed. As such, a condition referenced by a security policy may reference any quantum of evidence that, when present, would motivate one to perform the action specified by the policy. Illustrative examples and further discussion about the types of conditions that a security policy may reference is presented below in the section entitled "Illustrative Conditions that may be Referenced by a Security Policy."

In an embodiment, a security policy may be performed in a "1-click" fashion. That is to say, the owner of one or more clients may use web interface 210 of server 120 to, with the click of one mouse button or keystroke, instruct server 120 to either send one or more predefined polices to one or more clients of the owner or send one or more predefined commands to one or more clients of the owner. For example, the owner of a plurality of clients may use web interface 210 to organize the plurality of clients into one or more logical groupings, such as by division, department, or type of client. Such logical groupings may aid the owner of the plurality of clients in managing the security policies followed by a large number of clients. After the owner has defined a set of one or more commands and/or a set of one or more security policies, the owner may disseminate the set of one or more commands and/or the set of one or more security policies to a logical grouping of clients by sending a single instruction (a "1-click") to web interface 210 of server 120.

Using embodiments of the invention, a corporate IT department may manage the security policies of thousands of clients. The IT department may establish different security policies for clients used by personnel in the engineering department than clients used by personnel in the sales department. For example, the IT department may establish a policy, only to be used by clients operated by personnel in the sales department that will erase the hard-drives of stolen clients that are used by sales personnel under the rationale that the data stored on a client used by someone in the sales department may be very sensitive, but easy to re-create. On the other hand, the IT department may establish another policy, only to be used by clients operated by personnel in the engineering department, that will encrypt the data stored on the hard-drives of stolen clients operated by engineering personnel under the rationale that the data stored on a client used by someone in the engineering department may be hard to re-create. In this way, a centralized entity (such as an IT department) may establish a different set of security policies for various groups of clients, and the centralized entity may instruct server 120 to implement security policies or send commands to each client in a group of clients by issuing a single instruction to server 120.

In an embodiment of the invention, the owner of a client (such as a company) may communicate with server 120 to send commands or policy data to one or more clients owned by the owner; however, the user of a client may not modify the policy data stored on the client. In this way, a company or other centralized entity that manages a large number of clients may ensure that each client is implementing the same security policies. In this way, the user of a client cannot configure the client in a manner that disables or otherwise reduces the security protection afforded by the securities policies stored by BIOS agent 112 on the client.

Illustrative Commands that a Client May Perform

In an embodiment, server 120 may issue a command to a particular client for immediate performance. Additionally, a client may store a security policy which instructs the client to perform a particular command when a particular condition is met. Embodiments of the invention may implement a variety of different commands, such as retrieve, erase, encrypt, and disable. Each of these commands shall be explained in detail below.

The retrieve command instructs a client to retrieve a particular resource, such as a file, and send a copy of the resource to server 120 over communications link 130. The retrieve command is useful when the owner of a missing or stolen client would like to retrieve a limited number of resources from the lost or stolen client. In an embodiment, resources that are retrieved using the retrieve command are then deleted from the missing client, as the client may be in possession of a malicious user.

In an embodiment, to issue a retrieve command to a client, the name of the resource (which may be a file or folder, for example) is included as an argument to the retrieve command. In another embodiment, the name of the resource to be retrieved and the path to the resource is included an argument to the retrieve command.

There may be limitations to the size of resources that are able to be retrieved using the retrieve command, as it would not be desirable to inundate server 120 with a large volume of incoming data.

The erase command instructs a client to erase one or more resources, such as a file. The erase command is use to erase sensitive or confidential data from a client. In many cases, data stored on a client may be backed-up or stored in another location on a regular basis; consequently, the real concern when a client is stolen may be that sensitive or confidential data may be accessed by a malicious party, rather than a concern that the client itself may not be retrieved. Thus, the erase command may be used to affirmatively erase data stored on client, thereby preventing the data from being accessed by unauthorized parties. In an embodiment, the path to the resources that are intended to be erased and well as information identifying the resources to be erased should be identified as arguments to the erase command.

In an embodiment, when a client performs the erase command, if the client is able, the client sends a confirmation, to server 120, that the data identified by the erase command was erased. In this way, the owner of the client may have some assurance that sensitive or confidential data on the client was not accessed by a malicious party.

The disable command instructs a client to shut down and become unable to boot. Thus, a client that has been disabled by performing the disable command is unable to reboot. For this reason, a client may be said to "turn into brick" by via the disable command, because the client, after performing the disable command, is unable to operate, and becomes "as useful as a brick" to an unauthorized user.

In an embodiment, a client that has been disabled by performing the disable command may be able to return to operational status if one or more authentication credentials are provided to the client. Presumably, a thief who stole a client would not know the proper authentication credential(s) to submit to the client to return the client to an operational state. In such an embodiment, it may be necessary to obtain an authentication credential from two or more parties, such as the current user of the client and the owner of the client. The user of the client may be prompted to submit an authentication credential to the client if a blank screen or a screen displaying a warning is shown by the client. In such an embodiment, the client would not necessary have to be powered down, but instead, would not respond to any input to the client (such as mouse movements or keystrokes) except for a secret sequence of input (such as holding two or more keys together at the same time). If a user is unfamiliar with this procedure, then the user will likely believe the client is broken, and may not attempt any further action to retrieve data from the client. However, if the user is familiar with this procedure, the user may quickly submit the secret sequence of input to the client to enable the user to gain access to the client.

In an embodiment, when a client is disabled by performing the disable command, the client may emit a loud alarm. Such an approach may be useful for notifying of nearby people the client may be stolen. In an embodiment, when a client is disabled by performing the disable command, the client may display a message on a screen indicating the client has been stolen or is being accessed in an authorized manner. The message may also contain information to assist in unlocking the client. For example, the message may instruct the user of the client call a particular telephone number to unlock the client. When the user calls the telephone number, the user's identity may be confirmed, and the user may be given a password or other authentication credential to provide to the client to unlock the client.

The specific actions taken by a client that has been instructed to perform a disable command may be defined either by the disable command itself or by a security policy stored by the client. For example, the client may store policy data that describes a policy that indicates that, when the client receives a disable command, the client is only to emit an alarm if the physical location of the client is outside of a particular geographical area.

Other illustrative commands which may be referenced by a policy or be conveyed to a client from a server include an instruction to record the keystrokes of the user of the client and an instruction to take one or more pictures or video using a web cam or other digital camera associated with the client.

The commands discussed above may be sent from server 120 to a particular client for immediate execution by the client. Alternately, as discussed below, the commands may be referenced by policy data, which defines one or more security policies, sent from server 120 to a particular client. When a condition referenced by a policy is met, then a command referenced by a policy may be performed. For example, server 120 may send a command to client 104 to enter disable state 330. Alternately, server 120 may send policy data to client 104 which contains a policy that states the client should enter disable state 330 when a condition is met by the client, such as the client's IP address changing or the client physically moving outside of a bounded geographical area identified by the policy.

Illustrative Conditions that may be Referenced by a Security Policy

In an embodiment, a security policy specifies that one or more actions are to be performed by a client if one or more conditions are met. A condition referenced by a security policy serves to indicate when a particular action is performed. Security policies may reference a wide variety of conditions. Non-limiting, illustrative examples of conditions which may be referenced by a security policy, as an indication of when a particular action is to be performed, includes: (a) when a IP address of the client changes, (b) when the name of the client changes, (c) when the client does not connect to server 120 for a predefined length of time, (d) when the client does not receive a heartbeat message from the operating system agent executing thereon after an expected period of time, and (e) when the user of the client is not able to supply valid authentication credentials.

In an embodiment, a security policy may specify that the client may reboot a certain number of times without receiving a heartbeat message from the operating system agent residing on the client. While allowing a client to reboot without receiving a heartbeat message may introduce an element of risk to the resources of the client, it may be necessary to reboot the client without receiving a heartbeat message when the client is being repaired. As a result, a security policy that specifies, as a condition to the perform of a security action, number of times the client may reboot without receiving a heartbeat message from the operating system agent residing on the client should balance convenience versus security.

Two other conditions that may be referenced by securities policies of embodiments of the invention involve geofencing and the proximity of the client to a wireless device. Each of these techniques is described in greater detail below.

Geofencing

In an embodiment, a client of system 100 may be designed to perform an action or command whenever the client physically moves outside of one or more bounded geographical areas. An owner of a client may define one or more bounded geographical areas using web interface 210 of server 120. The owner may then define one or more policies that instruct a client to perform an action or command whenever the client physically moves outside of one or more bounded geographical areas. The defined policies, which reference the one or more bounded areas, may be communication from server 120 to one or more clients.

A client storing a security policy that references one or more bounded geographical areas may employ an application module, of operating system agent 114, to detect and fetch global positioning service (GPS) information for the client. Thus, if the client physically moves outside of the one or more bounded geographical areas referenced by the security policy, the client may be apprised and perform the one or more actions specified by the security policy.

To illustrate an example, a security policy may be stored on a client that instructs the client to enter a disabled state if the client is physically moved outside of one or more bounded geographical areas. As another example, another security policy may be stored on the client that instructs the client to perform a different action, such as erasing all data stored on the client, if the client is physically moved into one or more bounded geographical areas, such as a bounded geographical area corresponding to a country that has weak intellectual property locations or to a location associated with a competitor.

There is no limit to the size, shape, or number of bounded geographical areas which may be referenced by a security policy. For example, a security policy may define a bounded geographical region around a particular building or physical property of the owner of the client. In this way, if the client is taken outside of a building or off the property of the owner, the client may perform a certain action, such as disabling itself or erasing sensitive or confidential information.

Proximity to Wireless Device

In an embodiment, a client of system 100 may be designed to perform an action or command whenever the user of the client moves his or her mobile device (such as a cell phone) beyond a specified distance from the client. For example, client 106 may immediately lock and/or power down the client and put the client in sleep mode when the user of client 106 walks with his cell phone further than a specified distance from client 106. Further, when the user of client 106 moves his cell phone within the specified distance to client 106, client 106 may unlock and/or power on client 106. This approach advantageously allows a client to become secure and/or save power whenever the user walks away, with a mobile device, from the client.

Figure 9:
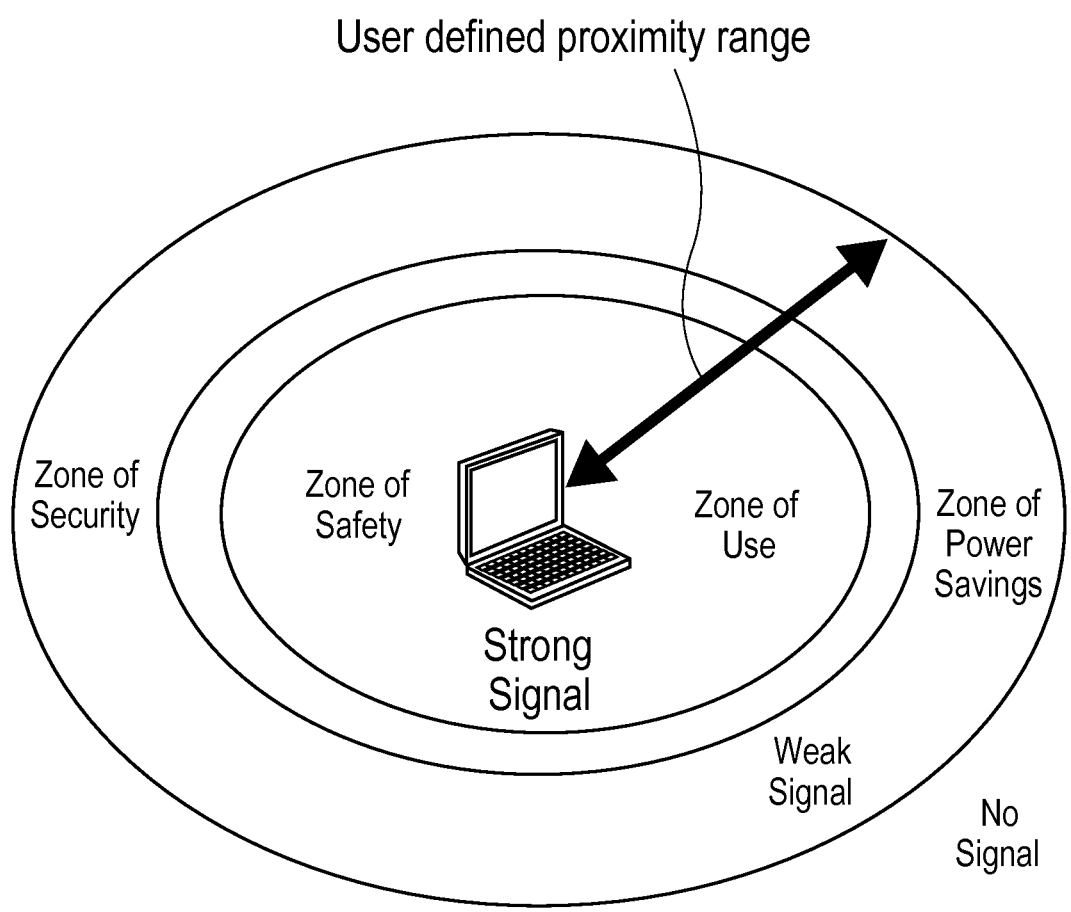
FIG. 9 is an illustration of a proximity condition according to an embodiment of the invention.

FIG. 9 is an illustration of a proximity condition according to an embodiment of the invention. As shown by FIG. 9, a zone of use is established around the client. If the user of the client leaves the zone of use with a mobile device, such as a Bluetooth cell phone, a security policy, stored by the client, may instruct the client to perform a certain action or command. The distance between the user's mobile device and the client is determined by evaluating the strength of the Bluetooth signal between the user's mobile device and the client.

Additional details about the approach depicted in FIG. 9 may be found in U.S. patent Ser. No. 12/321,504, entitled "Secure Platform Management with Power Savings Capability," filed by Gaurav Banga et al. on Jan. 21, 2009, the contents of which are herein incorporated by reference as if fully set forth herein.

Facilitating Legitmate use of Clients

Embodiments of the invention not only prevent the theft and unauthorized access of resources of a client, but also accommodate the legitimate use of clients by authorized users. An authorized user may have a legitimate need to remove a hard-disk drive or other persistent storage medium from a client and install a new hard-disk drive or other persistent storage medium in the client. The new hard-disk drive or persistent storage medium would not have operating system agent 114 installed, whereas the client would have BIOS agent 112 installed in the BIOS of the client. As the new hard-disk drive or persistent storage medium does not have operating system agent 114 installed, BIOS agent 112 on the client would not receive a heartbeat. In response to not receiving a heartbeat after an expected period of time, BIOS agent 112 checks to see if modules of operating system agent 114 are installed and uncorrupted; consequently, BIOS agent 112 would soon discover that operating system agent 114 is not installed in the new hard-disk drive or persistent storage medium. Thereafter, BIOS agent 112 copies chSync module 410 to the operating system of the client and communicates with server 120 to obtain data necessary to install operating system agent 114 in the operating system of the client. In this process, BIOS agent 112 sends information identifying the client to server 120, such as the serial number of the client. In this way, BIOS agent 112 may cause operating system agent 114 to be installed upon the new hard-disk drive or persistent storage medium and may repopulate operating system agent 114 with all the appropriate modules using the data obtained from server 120.

If a user removes a persistent storage medium (such as a hard-disk drive) from a first client of system 100 and installs the persistent storage medium into a second client that is the same make and model of the first client, data stored in the persistent storage medium will still not be accessible by a user operating the second client. This is so because the second client would either be lacking a BIOS agent 112 or would not be installed with a BIOS agent 112 that is configured to operate with operating system agent 114 installed on the persistent storage medium.

When the new persistent storage medium is powered on, it would try to send a state message to server 120, and, working in conjunction with server 120, would attempt to repopulate BIOS agent 112 in the BIOS of the second client. The user of the second client may be asked by operating system agent 114 if the user would like to transfer a license to agent 110 from the first client to the second client. The owner of the first client may receive an email from server 120 notifying the owner about the request to transfer the license from the first client to the second client. The owner of the first client would need to approve of the transfer of license from the first client to the second client before data may be accessed from the persistent storage medium using the second client. In an embodiment, each agent 110 requires a license to operate, and if either BIOS agent 112 or operating system agent 114 resides on a client for which it does not have a license, it will not operate. To uninstall agent 110 from a client, one needs to submit appropriate authentication credential to do so.

Composite Tracking Algorithm (CTA)

In an embodiment, there may be a variety of different classes of data sent by a client to server 120. Such different classes of data may include IP trace information, global positioning system (GPS) coordinates, surrounding Wifi access points, and webcam picture and video data. Server 120 may collect such information for purposes of tracking the geographical location of clients in system 100. These different classes of data shall be discussed below.

IP trace information may include the public IP address of the client and the set of IP addresses that data packets sent from the client pass through to reach server 120. The public IP address of the client may be determined by gathering the source IP address from the server socket receiving the client connection. The list of hops through which the data packets sent from the client go through may be determined by sending adaptive TTL (time to live) UDP packets to server 120 from the client. In order to determine if the client is being an IP proxy, server 120 may correlate the list of hops with the public IP of the client. In this way, server 120 may effectively discover the real public IP address of the client. The real public IP address of the client is then matched against a database of Internet Service Providers (ISPs) which returns the probable address of the originating client message. This address may be translated to a set of longitude and latitude coordinates.

GPS coordinate data comprises coordinates, namely longitude and latitudes, gathered by the GPS service provided by the client as well as other information, such as accuracy factors.

Surrounding Wifi Access point data may include a list of all public Wifi access points surrounding the client. The list of surrounding wifi access points is formatted and correlated with a database of public wifi access points, which may be used by server 120 to determine a probable set of longitude and latitude coordinates for the client using triangulation.

Each class of data has a weighted value in the composite tracking algorithm (CTA). For example, in an embodiment, GPS coordinate data may have the highest weight in the CTA when the client is in a position to gather relevant and accurate longitude and latitude coordinates from its GPS service. IP trace information may have the lowest weight and Wifi triangulation may have an average weight. The result of the CTA is that a geographical position is mapped to a mapping service.

In an embodiment, webcam shot data may provide visual information about the operator of the client. Webcam shots may be taken at boot time and on demand, and sent to server 120, where the webcam shots are associated with the geographical location of the client at the time the shot was taken. Webcam shot data may include one or more digital pictures, digital video, or both.

In an embodiment, server 120 may provide an interface which visually depicts webcam shot data on a map. For example, a map may depict the five most recent geographical locations of the client on the map, and at each location, may depict webcam shot data to visually display the operator of the client at that location.

Location Aware Client

In an embodiment, by receiving CTA data from server 120, a client may become self-aware as to its geographical location. By employing the predefined security policies the client obtains from server 120, the client is able to perform actions based on the CTA data and its securities policies. Such actions that a client may take in response to a security policy referencing the client's current geographical location may include disabling the client, degrading the client, and increasing the frequency of the reports the client makes to server 120. For example, a client may recognize that it is in an area that is unknown (e.g. a coffee shop) versus a known area (such as the home of the user or at the office). The client may determine what action to take based on the CTA data that describes its geographical location and the security polices stored on the client by BIOS agent 112. As an example, a client may enter degraded state 320 if the client detects that the client is in an unknown network. Advantageously, embodiments of the invention enable the client to raise its level of security automatically based on its current geographical location and its surroundings.

Instant Command

In an embodiment, commands may be sent by server 120 to a particular client for execution in real-time. Thus, if a user wishes a particular client to immediately perform a particular command, the user may access an interface provided by server 120 to issue a command, for immediate execution, to a particular client. In order for a client to be instructed in real time of commands or special tasks (such as to disable, to retrieve a file, to erase one or more files) that are initiated using a user interface provided by server 120, a communication channel is kept open between the client and server 120 at all time where there is network connectivity. This communication channel enables server 120 to initiate a connection to the client on demand, which cannot be accomplished in a natural way in today's network environments with network address translation and firewalls.

The communication channel effectively enables a command to be sent from server 120 to the client for immediate execution upon receipt. For example, a user that wishes to disable his lost laptop may access the user interface provided by server 120, and initiate an instant lock command on his lost laptop, which would effectively disable his laptop in real time. Likewise, the user could initiate other commands to be performed on his laptop immediately upon receipt, such as a retrieve command or an erase command.

BCOI (BIOS Connect Over Internet)

In an embodiment, agent 110 of a client may include a component (referred to as BCOI Failsafe BIOS component) which is configured to directly communicate with server 120 from the BIOS level of the client using the network stack. This transport mechanism is configured to allow (a) obtaining policy updates and/or commands on the BIOS level directly from server 120, (b) download and update modules of agent 110, such as those modules required for persistency, (c) support one-time password authentication methods to unlock the system, and (d) support a "remote unlock" feature, which enables a user to access a user interface provided by server 120 to unlock a particular client from server 120.

Persistence

In an embodiment, agent 110 may check a heartbeat recovery flag in the BIOS and initiate a restore process for the client upon which agent 110 resides if the heartbeat recovery flag so indicates. The restore process can be initiated when the client is booted and/or when the client resumes from sleep mode or hibernate mode. One or more modules of agent 110 may copy a module (referred to as a "FailSafe Windows module" or "FailSafe OS module") from a secure location (such as BIOS Flash Memory) to an appropriate partition of the operating system of the client (which may be, but need not be, MS Windows from Microsoft Corporation of Redmond, Wash.). The one or more modules may be recovered to a particular partition specified during provisioning or to all applicable partitions. All modules that are recovered may be authenticated before they are loaded and executed.

Data Protection

In an embodiment, locking mechanisms allows integration with data protection solutions such as the standard ATA-based HDD and Full Disk Encryption. One may create a policy that not only locks the client, but also enforces disk data encryption. For example, when a user sends the lock command to the client, the FDE secure data (encrypt) callbacks may be called to enable the "data protection" first and thereafter, the lock will be performed. Thus, even if the hard-disk drive is removed from the client, a malicious user cannot access the data stored on the hard-disk drive. Agent 110 may store a key to perform such encryption and decryption in a secure location, such as in the BIOS of the client.

Implementing Mechanisms

Figure 10:
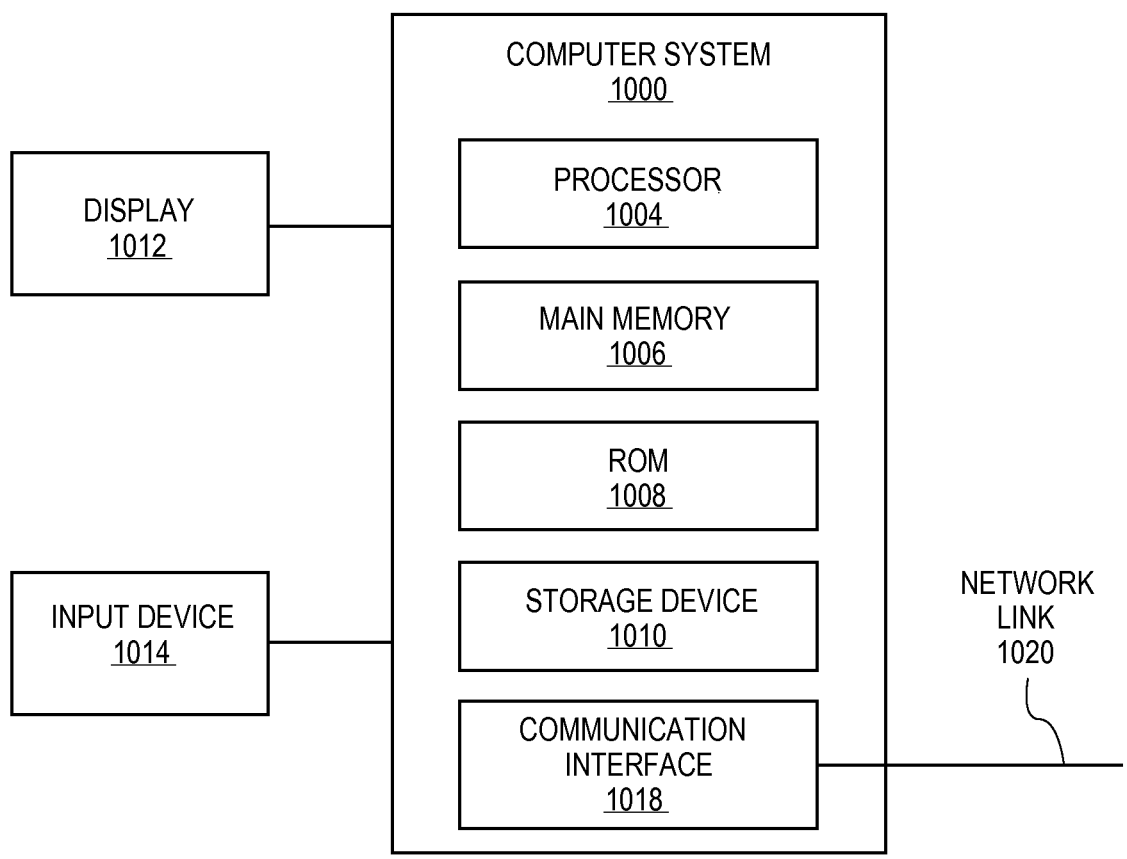
FIG. 10 is a block diagram that illustrates a computer system upon which an embodiment of the invention may be implemented.

In an embodiment, one or more of clients 102, 104, and 106 may each be implemented using a computer system. FIG. 10 is a block diagram that illustrates a computer system 1000 upon which an embodiment of the invention may be implemented. In an embodiment, computer system 1000 includes processor 1004, main memory 1006, ROM 1008, storage device 1010, and communication interface 1018. Computer system 1000 includes at least one processor 1004 for processing information. Computer system 1000 also includes a main memory 1006, such as a random access memory (RAM) or other dynamic storage device, for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device for storing static information and instructions for processor 1004. A storage device 1010, such as a magnetic disk or optical disk, is provided for storing information and instructions.

Computer system 1000 may be coupled to a display 1012, such as a cathode ray tube (CRT), a LCD monitor, and a television set, for displaying information to a user. An input device 1014, including alphanumeric and other keys, is coupled to computer system 1000 for communicating information and command selections to processor 1004. Other non-limiting, illustrative examples of input device 1014 include a mouse, a trackball, or cursor direction keys for communicating direction information and command selections to processor 1004 and for controlling cursor movement on display 1012. While only one input device 1014 is depicted in FIG. 10, embodiments of the invention may include any number of input devices 1014 coupled to computer system 1000.

Embodiments of the invention are related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a network link 1020 to computer system 1000.

Communication interface 1018 provides a two-way data communication coupling to a network link 1020 that is connected to a local network. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through a local network to a host computer or to data equipment operated by an Internet Service Provider (ISP).

Computer system 1000 can send messages and receive data, including program code, through the network(s), network link 1020 and communication interface 1018. For example, a server might transmit a requested code for an application program through the Internet, a local ISP, a local network, subsequently to communication interface 1018. The received code may be executed by processor 1004 as it is received, and/or stored in storage device 1010, or other nonvolatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more machine-readable non-transitory mediums storing one or more sequences of instructions for securing a client, which when executed, cause:

an operating system agent to send, at intervals during the execution of an operating system of the client, a message to a BIOS agent, wherein the message describes an operational state of the operating system agent, wherein the BIOS agent resides in a runtime portion of the BIOS of the client, wherein the operating system agent is one or more software modules that execute in the operating system, and wherein the BIOS agent is one or more software modules operating in a BIOS of the client, wherein the BIOS agent receives messages from the operating system agent after the client has booted; and the BIOS agent to perform, after the client has booted, an action based on a policy, wherein the policy is described by policy data stored within the BIOS of the client, and wherein the BIOS agent performs the action in response to either (a) the operational state described by the message, or (b) the BIOS agent not receiving the message after an expected period of time, wherein the action is performed by the BIOS agent while the operating system is operational.

2. The one or more machine-readable non-transitory mediums of claim 1, wherein the client is a laptop computer.

3. The one or more machine-readable non-transitory mediums of claim 1, wherein the policy data is stored by the BIOS on a flash microchip, and wherein the policy data is encrypted on the flash microchip.

4. The one or more machine-readable non-transitory mediums of claim 1, wherein the expected period of time is measured by a number of times the client is rebooted.

5. The one or more machine-readable non-transitory mediums of claim 1, wherein the operational state described by the message indicates whether any portion of the operating system agent has been removed or is corrupted.

6. The one or more machine-readable non-transitory mediums of claim 1, wherein at least one module, of the one or more software modules comprising the operating system agent, monitors resources of the client, and wherein at least two modules, of the one or more software modules comprising the operating system agent, contribute information for inclusion within the message.

7. The one or more machine-readable non-transitory mediums of claim 1, wherein the action is to disable the client.

8. The one or more machine-readable non-transitory mediums of claim 1, wherein the operational state described by the message indicates the number of times a portion of the operating system agent has been removed or become corrupted, and wherein the policy references the number of times the portion of the operating system agent has been removed or become corrupted.

9. The one or more machine-readable non-transitory mediums of claim 1, wherein execution of the one or more sequences of instructions further causes:
   upon the BIOS agent not receiving the message after the expected period of time, the BIOS agent to determine if the operating system agent is installed on the client; and
   upon the BIOS agent determining that the operating system agent is not installed on the client, the BIOS agent to cause the operating system agent to become installed in the operating system of the client.

10. A method for securing a client, comprising:
   an operating system agent sending, at intervals during the execution of an operating system of the client, a message to a BIOS agent, wherein the message describes an operational state of the operating system agent, wherein the BIOS agent resides in a runtime portion of the BIOS of the client, wherein the operating system agent is one or more software modules that execute in the operating system, and wherein the BIOS agent is one or more software modules operating in a BIOS of the client,
   wherein the BIOS agent receives messages from the operating system agent after the client has booted; and
   the BIOS agent performing, after the client has booted, an action based on a policy, wherein the policy is described by policy data stored within the BIOS of the client, and wherein the BIOS agent performs the action in response to either (a) the operational state described by the message, or (b) the BIOS agent not receiving the message after an expected period of time,
   wherein the action is performed by the BIOS agent while the operating system is operational.

11. The method of claim 10, wherein the client is a laptop computer.

12. The method of claim 10, wherein the policy data is stored by the BIOS on a flash microchip, and wherein the policy data is encrypted on the flash microchip.

13. The method of claim 10, wherein the expected period of time is measured by a number of times the client is rebooted.

14. The method of claim 10, wherein the operational state described by the message indicates whether any portion of the operating system agent has been removed or is corrupted.

15. The method of claim 10, wherein at least one module, of the one or more software modules comprising the operating system agent, monitors resources of the client, and wherein at least two modules, of the one or more software modules comprising the operating system agent, contribute information for inclusion within the message.

16. The method of claim 10, wherein the action is to disable the client.

17. The method of claim 10, wherein the operational state described by the message indicates the number of times a portion of the operating system agent has been removed or become corrupted, and wherein the policy references the number of times the portion of the operating system agent has been removed or become corrupted.

18. The method of claim 11, further comprising:
   upon the BIOS agent not receiving the message after the expected period of time, the BIOS agent determining if the operating system agent is installed on the client; and
   upon the BIOS agent determining that the operating system agent is not installed on the client, the BIOS agent causing the operating system agent to become installed in the operating system of the client.

19. An apparatus for securing resources thereon, comprising:
   one or more processors; and
   one or more machine-readable non-transitory mediums storing one or more sequences of instructions, which when executed by the one or more processors, causes:
      an operating system agent to send, at intervals during the execution of an operating system of the apparatus, a message to a BIOS agent, wherein the message describes an operational state of the operating system agent, wherein the BIOS agent resides in a runtime portion of the BIOS of the client, wherein the operating system agent is one or more software modules that execute in the operating system, and wherein the BIOS agent is one or more software modules operating in a BIOS of the apparatus,
   wherein the BIOS agent receives messages from the operating system agent after the client has booted; and
   the BIOS agent to perform, after the client has booted, an action based on a policy, wherein the policy is described by policy data stored within the BIOS of the apparatus, and wherein the BIOS agent performs the action in response to either (a) the operational state described by the message, or (b) the BIOS agent not receiving the message after an expected period of time,
   wherein the action is performed by the BIOS agent while the operating system is operational.

* * * * *

UNITED STATES PATENT AND TRADEMARK OFFICE
CERTIFICATE OF CORRECTION

PATENT NO.         : 8,745,383 B2                                       Page 1 of 1
APPLICATION NO.    : 12/538044
DATED              : June 3, 2014
INVENTOR(S)        : Tarkhanyan et al.

It is certified that error appears in the above-identified patent and that said Letters Patent is hereby corrected as shown below:

In the Claims:

Claim 1, column 26, line 54, replace "the" with --a--.

Claim 1, column 26, line 58, replace "a" with --the--.

Claim 10, column 27, line 47, replace "the" with --a--.

Claim 10, column 27, line 51, replace "a" with --the--.

Claim 19, column 28, line 44, replace "the" with --a--.

Claim 19, column 28, line 48, replace "a" with --the--.

Signed and Sealed this
Eighth Day of September, 2015

Michelle K. Lee
*Director of the United States Patent and Trademark Office*